United States Patent
Vajda et al.

(10) Patent No.: US 10,692,243 B2
(45) Date of Patent: Jun. 23, 2020

(54) OPTIMIZATIONS FOR DYNAMIC OBJECT INSTANCE DETECTION, SEGMENTATION, AND STRUCTURE MAPPING

(71) Applicant: Facebook, Inc., Menlo Park, CA (US)

(72) Inventors: Peter Vajda, San Mateo, CA (US); Peizhao Zhang, Fremont, CA (US); Fei Yang, Fremont, CA (US); Yanghan Wang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 138 days.

(21) Appl. No.: 15/971,930

(22) Filed: May 4, 2018

(65) Prior Publication Data

US 2019/0171903 A1 Jun. 6, 2019

Related U.S. Application Data

(60) Provisional application No. 62/593,980, filed on Dec. 3, 2017.

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00369* (2013.01); *G06K 9/3233* (2013.01);
(Continued)

(58) Field of Classification Search
CPC ..... G06T 7/75; G06T 7/11; G06T 7/73; G06T 7/30; G06T 7/70; G06T 2207/20076;
(Continued)

(56) References Cited

U.S. PATENT DOCUMENTS 7,848,548 B1  12/2010  Moon
8,477,998 B1  7/2013  Kim
(Continued)

FOREIGN PATENT DOCUMENTS

WO  WO 2010088033 A2  8/2010
WO  WO 2017139927 A1  8/2017

OTHER PUBLICATIONS

Girshick, et al., Fast R-CNN, Microsoft Research, arXiv:1504.08083v2, Sep. 27, 2015, 9 pages, Sep. 27, 2015.
(Continued)

*Primary Examiner* — Jose L Couso
(74) *Attorney, Agent, or Firm* — Baker Botts L.L.P.

(57) ABSTRACT

In one embodiment, a system may access an image and generate a feature map for the image using a neural network. The system may identify regions of interest in the feature map. Regional feature maps may be generated for the regions of interest, respectively. Each of the regional feature maps has a first, a second, and a third dimension. The system may generate a first combined regional feature map by combining the regional feature maps. The combined regional feature map has a first, a second, and a third dimension. The system may generate a second combined regional feature map by processing the first combined regional feature map using one or more convolutional layers. The system may generate, for each of the regions of interest, information associated with an object instance based on a portion of the second combined regional feature map associated with that region of interest.

17 Claims, 13 Drawing Sheets
(4 of 13 Drawing Sheet(s) Filed in Color)

(51) Int. Cl.
*G06K 9/46* (2006.01)
*G06T 7/11* (2017.01)
*G06N 3/04* (2006.01)
*G06N 3/08* (2006.01)
*G06K 9/62* (2006.01)
*G06K 9/32* (2006.01)
*G06N 5/02* (2006.01)

(52) U.S. Cl.
CPC ........... *G06K 9/4633* (2013.01); *G06K 9/623* (2013.01); *G06K 9/6232* (2013.01); *G06K 9/6251* (2013.01); *G06K 9/6256* (2013.01); *G06N 3/0454* (2013.01); *G06N 3/084* (2013.01); *G06T 7/11* (2017.01); *G06T 7/73* (2017.01); *G06K 9/00671* (2013.01); *G06K 9/00711* (2013.01); *G06K 2209/21* (2013.01); *G06N 5/022* (2013.01); *G06T 2207/20076* (2013.01); *G06T 2207/20081* (2013.01); *G06T 2207/20084* (2013.01); *G06T 2207/20104* (2013.01); *G06T 2207/30196* (2013.01); *G06T 2210/12* (2013.01)

(58) Field of Classification Search
CPC . G06T 2207/20081; G06T 2207/20084; G06T 2207/20104; G06T 2207/30196; G06T 2210/12; G06K 9/00671; G06K 9/00711; G06K 9/00369; G06K 9/3233; G06K 9/4633; G06K 9/6232; G06K 9/6251; G06K 9/6256; G06K 9/66; G06K 9/4628; G06K 9/46; G06K 9/6267; G06K 9/628; G06K 9/00718; G06K 9/00201; G06K 9/00208; G06K 9/00228; G06K 9/00288; G06K 9/00335; G06K 9/00684; G06K 9/00993; G06K 9/3241; G06K 9/627; G06K 9/6273; G06K 9/72; G06K 9/4671; G06K 9/685; G06K 2209/21; G06K 2209/05; G06K 2009/4666; G06K 2009/00738; G06N 5/022; G06N 3/0454; G06N 3/084; G06N 3/0445; G06N 3/08; G06N 3/02; G06N 3/082; G06N 3/04; G06N 3/0481; G06N 3/088; G06N 3/0418; G06N 20/00; G06N 7/00; G06F 16/5838; G06F 17/15; G06F 17/18
See application file for complete search history.

(56) References Cited

U.S. PATENT DOCUMENTS

| | | | | |
|---|---|---|---|---|
| 10,321,728 | B1* | 6/2019 | Koh | .......................... A41H 1/02 |
| 10,452,976 | B2* | 10/2019 | Yoo | ...................... G06K 9/4604 |
| 2010/0195899 | A1 | 8/2010 | Nc | |
| 2011/0182469 | A1 | 7/2011 | Ji | |
| 2011/0267344 | A1 | 11/2011 | Germann | |
| 2013/0028517 | A1 | 1/2013 | Yoo | |
| 2013/0121577 | A1 | 5/2013 | Wang | |
| 2013/0243255 | A1 | 9/2013 | Williams | |
| 2015/0278579 | A1 | 10/2015 | Saklatvala | |
| 2016/0104058 | A1* | 4/2016 | He | ....................... G06K 9/6255 382/156 |
| 2016/0335120 | A1 | 11/2016 | Gupta | |
| 2016/0342888 | A1 | 11/2016 | Yang | |
| 2017/0011281 | A1 | 1/2017 | Dijkman | |
| 2017/0046616 | A1 | 2/2017 | Socher | |
| 2017/0262995 | A1* | 9/2017 | Li | .......................... G06N 3/0445 |
| 2017/0286809 | A1 | 10/2017 | Pankanti | |
| 2018/0137642 | A1* | 5/2018 | Malisiewicz | ............. G06T 7/11 |
| 2019/0066326 | A1* | 2/2019 | Tran | ........................ G06F 16/29 |
| 2019/0073553 | A1* | 3/2019 | Yao | .......................... G06K 9/46 |
| 2019/0147221 | A1* | 5/2019 | Grabner | ............. G06K 9/00214 |
| 2019/0247199 | A1* | 8/2019 | Stinchfield | ............ A61F 2/4465 |
| 2019/0303715 | A1* | 10/2019 | Jiang | ..................... G06K 9/6272 |
| 2019/0318502 | A1* | 10/2019 | He | ....................... G06K 9/6257 |

OTHER PUBLICATIONS

Girshick, et al., Rich feature hierarchies for accurate object detection and semantic segmentation, Tech report, V5, arXiv:1311.2524v5, Oct. 22, 2014, 21 pages, Oct. 22, 2014.
Ren, et al., Faster R-CNN: Towards Real-Time Object Detection with Region Proposal Networks, Microsoft Research, Jan. 6, 2016, 14 pages, Jan. 6, 2016.
EESR received from EPO for EP Patent Application No. 18179593.1-1207, May 27, 2019.
Ramakrishna, et al., Reconstructing 3D Human Pose from 2D Image Landmarks, Robotics Institute, Carnegie Mellon University, 14 pages, Jan. 1, 2012.
Dewancker, 2D Pose Estimation Using Active Shape Models and Learned Entropy Field Approximations, University of British Columbia Image Understanding II Project, 6 pages, Apr. 23, 2012.
Akhter, et al., Pose-Conditioned Joint Angle Limits for 3D Human Pose Reconstruction, Max Planck Institute for Intelligent Systems, Tubingen, Germany, 10 pages, Jun. 1, 2015.
Belagiannis, et al., Recurrent Human Pose Estimation, Visual Geometry Group Department of Engineering Science University of Oxford, UK, 8 pages, May 1, 2017.
Ren, et al., Faster R-CNN: Towards Real-Time Object Detection with Region Proposal Networks, IEEE Transactions on Pattern Analysis and Machine Intelligence, 39(6):1-13, Jun. 1, 2017.
Joint Multi-Person Pose Estimation and Semantic Part Segmentation, 2017 IEEE Conference on Computer Vision and Pattern Recognition, 10 pages, Jul. 21, 2017.
International Search Report and Written Opinion for International Application No. PCT/US2018/031358, dated Nov. 9, 2018.
Extended Search Report for EP Patent Application No. 18177661.8-1207, dated Feb. 12, 2019.
Extended Search Report for EP Patent Application No. 18180861.9-1207, dated Apr. 16, 2019.
Girshick et al., "Deep Learning for Instance-level Object Understanding", Retrieved from the Internet, Jul. 21, 2017.
International Search Report and Written Opinion for International Application No. PCT/US2018/031365, dated Nov. 7, 2018.
International Search Report and Written Opinion for International Application No. PCT/US2018/031362, dated Nov. 9, 2018.

* cited by examiner

OPTIMIZATIONS FOR DYNAMIC OBJECT INSTANCE DETECTION, SEGMENTATION, AND STRUCTURE MAPPING

PRIORITY

This application claims the benefit, under 35 U.S.C. § 119(e), of U.S. Provisional Patent Application No. 62/593,980, filed 3 Dec. 2017, which is incorporated herein by reference.

TECHNICAL FIELD

This disclosure generally relates to computer vision.

BACKGROUND

Machine learning may be used to enable machines to automatically detect and process objects appearing in images. In general, machine learning typically involves processing a training data set in accordance with a machine-learning model and updating the model based on a training algorithm so that it progressively "learns" the features in the data set that are predictive of the desired outputs. One example of a machine-learning model is a neural network, which is a network of interconnected nodes. Groups of nodes may be arranged in layers. The first layer of the network that takes in input data may be referred to as the input layer, and the last layer that outputs data from the network may be referred to as the output layer. There may be any number of internal hidden layers that map the nodes in the input layer to the nodes in the output layer. In a feed-forward neural network, the outputs of the nodes in each layer—with the exception of the output layer—are configured to feed forward into the nodes in the subsequent layer.

Machine-learning models may be trained to recognize object features that have been captured in images. Such models, however, are typically large and require many operations. While large and complex models may perform adequately on high-end computers with fast processors (e.g., multiple central processing units ("CPUs") and/or graphics processing units ("GPUs")) and large memories (e.g., random access memory ("RAM") and/or cache), such models may not be operable on computing devices that have much less capable hardware resources. The problem is exacerbated further by applications that require near real-time results from the model (e.g., 10, 20, or 30 frames per second), such as augmented reality applications that dynamically adjust computer-generated components based on features detected in live video.

SUMMARY OF PARTICULAR EMBODIMENTS

Embodiments described herein relate to machine-learning models and various optimization techniques that enable computing devices with limited system resources (e.g., mobile devices such as smartphones, tablets, and laptops) to recognize objects and features of objects captured in images or videos. To enable computing devices with limited hardware resources (e.g., in terms of processing power and memory size) to perform such tasks and to do so within acceptable time constraints, embodiments described herein provide a compact machine-learning model with an architecture that is optimized for efficiency performing various image-feature recognition tasks. For example, particular embodiments are directed to real-time or near real-time detection, segmentation, and structure mapping of people captured in images or videos (e.g., satisfying a video's frame rate requirements). These real-time computer vision technologies may be used to enable a variety of mobile applications, such as dynamically replacing a video capture of a person with an avatar, detecting gestures, and performing other dynamic image processing related to particular objects (e.g., persons) appearing in the scene.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method may comprise, by a computing system:
accessing an image;
generating a feature map for the image using a neural network;
identifying a plurality of regions of interest in the feature map;
generating a plurality of regional feature maps for the plurality of regions of interest, respectively, wherein each of the plurality of regional feature maps has a first dimension, a second dimension, and a third dimension;
generating a first combined regional feature map by combining the plurality of regional feature maps, wherein the combined regional feature map has a first dimension, a second dimension, and a third dimension;
generating a second combined regional feature map by processing the first combined regional feature map using one or more convolutional layers; and
generating, for each of the plurality of regions of interest, information associated with an object instance based on a portion of the second combined regional feature map associated with that region of interest.

The first dimension and the second dimension of the first combined regional feature map may be equal to the first dimension and the second dimension of each of the plurality of regional feature maps, respectively.

The third dimension of the first combined regional feature map may be equal to or larger than a combination of the respective third dimensions of the plurality of regional feature maps.

The third dimension of each of the plurality of regional feature maps may correspond to height size or width size; and/or the first dimension or the second dimension may correspond to channel size.

The first combined regional feature map may include the plurality of regional feature maps with paddings inserted between adjacent pairs of the plurality of regional feature maps.

A size of the padding between each adjacent pair of the plurality of regional feature maps may be at least as wide as a kernel size used by the one or more convolutional layers.

The processing of the first combined regional feature map may be performed using a neural processing engine configured for performing convolutional operations on three-dimensional tensors.

The information associated with the object instance may be an instance segmentation mask, a keypoint mask, or a bounding box.

In an embodiment according to the invention, a system may comprise: one or more processors and one or more computer-readable non-transitory storage media coupled to one or more of the processors, the one or more computer-readable non-transitory storage media comprising instructions operable when executed by one or more of the processors to cause the system to perform operations comprising:
  accessing an image;
  generating a feature map for the image using a neural network;
  identifying a plurality of regions of interest in the feature map;
  generating a plurality of regional feature maps for the plurality of regions of interest, respectively, wherein each of the plurality of regional feature maps has a first dimension, a second dimension, and a third dimension;
  generating a first combined regional feature map by combining the plurality of regional feature maps, wherein the combined regional feature map has a first dimension, a second dimension, and a third dimension;
  generating a second combined regional feature map by processing the first combined regional feature map using one or more convolutional layers; and
  generating, for each of the plurality of regions of interest, information associated with an object instance based on a portion of the second combined regional feature map associated with that region of interest.

The first dimension and the second dimension of the first combined regional feature map may be equal to the first dimension and the second dimension of each of the plurality of regional feature maps, respectively.

The third dimension of the first combined regional feature map may be equal to or larger than a combination of the respective third dimensions of the plurality of regional feature maps.

The third dimension of each of the plurality of regional feature maps may correspond to height size or width size; and/or the first dimension or the second dimension may correspond to channel size.

The first combined regional feature map may include the plurality of regional feature maps with paddings inserted between adjacent pairs of the plurality of regional feature maps.

A size of the padding between each adjacent pair of the plurality of regional feature maps may be at least as wide as a kernel size used by the one or more convolutional layers.

The processing of the first combined regional feature map may be performed using a neural processing engine configured for performing convolutional operations on three-dimensional tensors.

In an embodiment according to the invention, one or more computer-readable non-transitory storage media may embody software that is operable when executed to cause one or more processors to perform operations comprising:
  accessing an image;
  generating a feature map for the image using a neural network;
  identifying a plurality of regions of interest in the feature map;
  generating a plurality of regional feature maps for the plurality of regions of interest, respectively, wherein each of the plurality of regional feature maps has a first dimension, a second dimension, and a third dimension;
  generating a first combined regional feature map by combining the plurality of regional feature maps, wherein the combined regional feature map has a first dimension, a second dimension, and a third dimension;
  generating a second combined regional feature map by processing the first combined regional feature map using one or more convolutional layers; and
  generating, for each of the plurality of regions of interest, information associated with an object instance based on a portion of the second combined regional feature map associated with that region of interest.

The first dimension and the second dimension of the first combined regional feature map may be equal to the first dimension and the second dimension of each of the plurality of regional feature maps, respectively.

The third dimension of the first combined regional feature map may be equal to or larger than a combination of the respective third dimensions of the plurality of regional feature maps.

The third dimension of each of the plurality of regional feature maps may corresponds to height size or width size; and/or the first dimension or the second dimension may correspond to channel size.

The processing of the first combined regional feature map may be performed using a neural processing engine configured for performing convolutional operations on three-dimensional tensors.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Embodiments described herein relate to machine-learning models and various optimization techniques that enable computing devices with limited system resources (e.g., mobile devices such as smartphones, tablets, and laptops) to recognize objects and features of objects captured in images or videos. To enable computing devices with limited hardware resources (e.g., in terms of processing power and memory size) to perform such tasks and to do so within acceptable time constraints, embodiments described herein provide a compact machine-learning model with an architecture that is optimized for performing various image-process tasks efficiently. For example, particular embodiments are directed to real-time detection (including classification), segmentation, and structure (e.g., pose) mapping of people captured in images or videos.

Figure 1A:
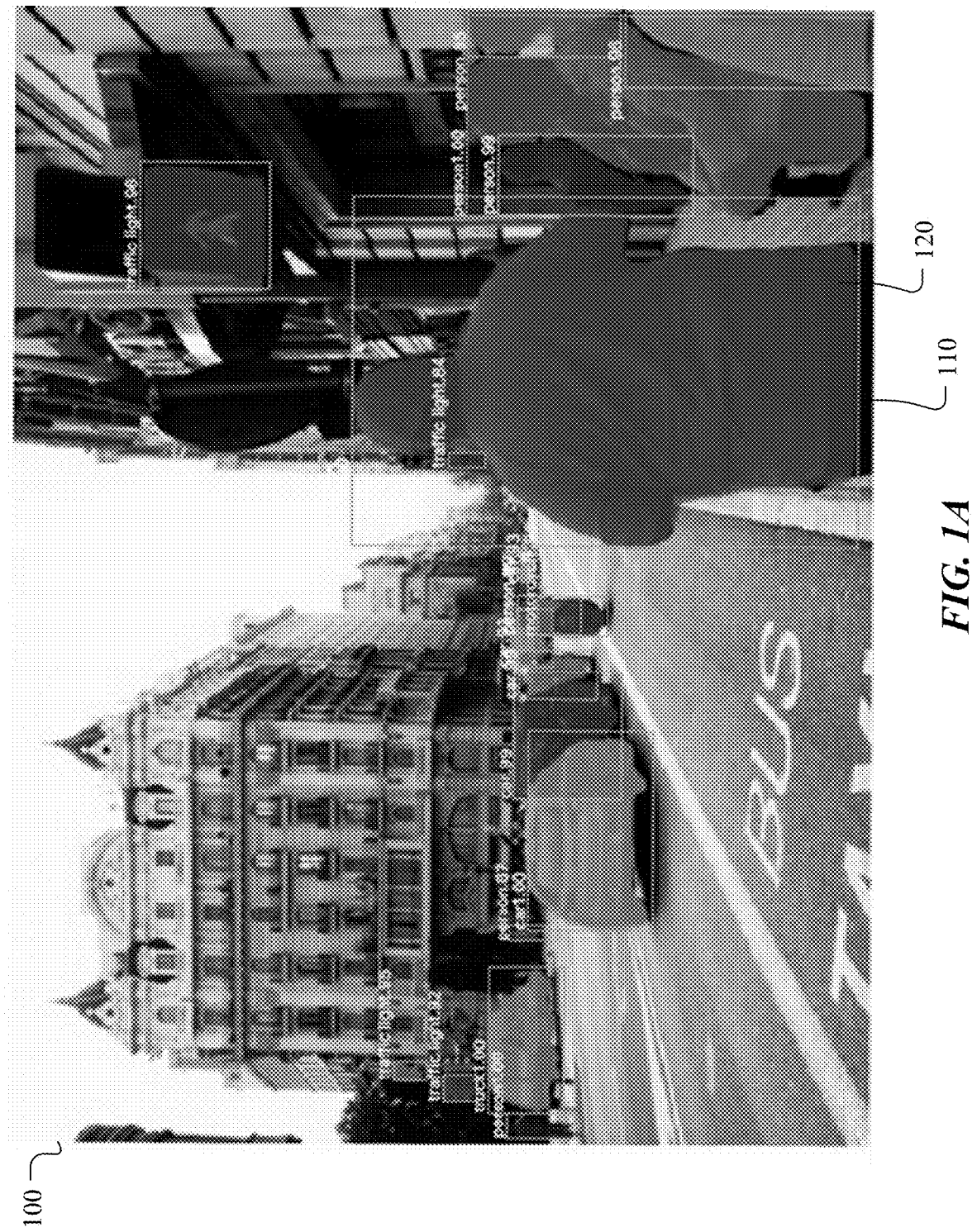
FIGS. 1A-1B illustrate examples of images with bounding boxes, segmentation masks, and keypoints.

FIG. 1A illustrates an example of an image 100 with bounding boxes 110 and segmentation masks 120. In particular embodiments, a machine-learning model is trained to process an image, such as image 100, and detect particular objects of interest in the image. In the example shown, the machine-learning model is trained to recognize features of people. In particular embodiments, the machine-learning model may output a bounding box 110 that surrounds a detected instance of an object type, such as a person. A rectangular bounding box may be represented as four two-dimensional coordinates that indicate the four corners of the box. In particular embodiments, the machine-learning model may additionally or alternatively output a segmentation mask 120 that identifies the particular pixels that belong to the detected instance. For example, the segmentation mask may be represented as a two-dimensional matrix, with each matrix element corresponding to a pixel of the image and the element's value corresponding to whether the associated pixel belongs to the detected person. Although particular data representations for detected persons and segmentation information are described, this disclosure contemplates any suitable data representations of such information.

Figure 1B:

FIG. 1B illustrates an example of an image 150 with segmentation masks 160 and structural keypoint 170, which may be used to represent the pose of a detected person. The segmentation mask 160, similar to the mask 120 shown in FIG. 1A, identify the pixels that belong to a detected person. In particular embodiments, a machine-learning model may additionally or alternatively map keypoints 170 to the detected person's structure. The keypoints may map to the detected person's shoulders, elbows, wrists, hands, hips, knees, ankles, feet, neck, jaw bones, or any other joints or structures of interest. In particular embodiments, the machine-learning model may be trained to map 19 keypoints to a person (e.g., neck, upper spinal joint, lower spinal joint, and left and right jaw bones, cheekbones, shoulders, elbows, wrists, hips, knees, and ankles). In particular embodiments, each keypoint may be represented as a two-dimensional coordinate, and the set of keypoints may be represented as an array or vector of coordinates. For example, 19 keypoints may be represented as a vector with 38 entries, such as $[x_1, y_1, \ldots x_{19}, y_{19}]$, where each pair of $(x_i, y_i)$ represents the coordinate one keypoint i. The order of each coordinate in the vector may implicitly indicate the keypoint to which the coordinate corresponds. For example, it may be predetermined that $(x_1, y_1)$ corresponds to the left-shoulder keypoint, $(x_2, y_2)$ corresponds to the right-shoulder keypoint, and so on. Although particular data representations for keypoints are described, this disclosure contemplates any suitable data representations of such information.

Figure 2:
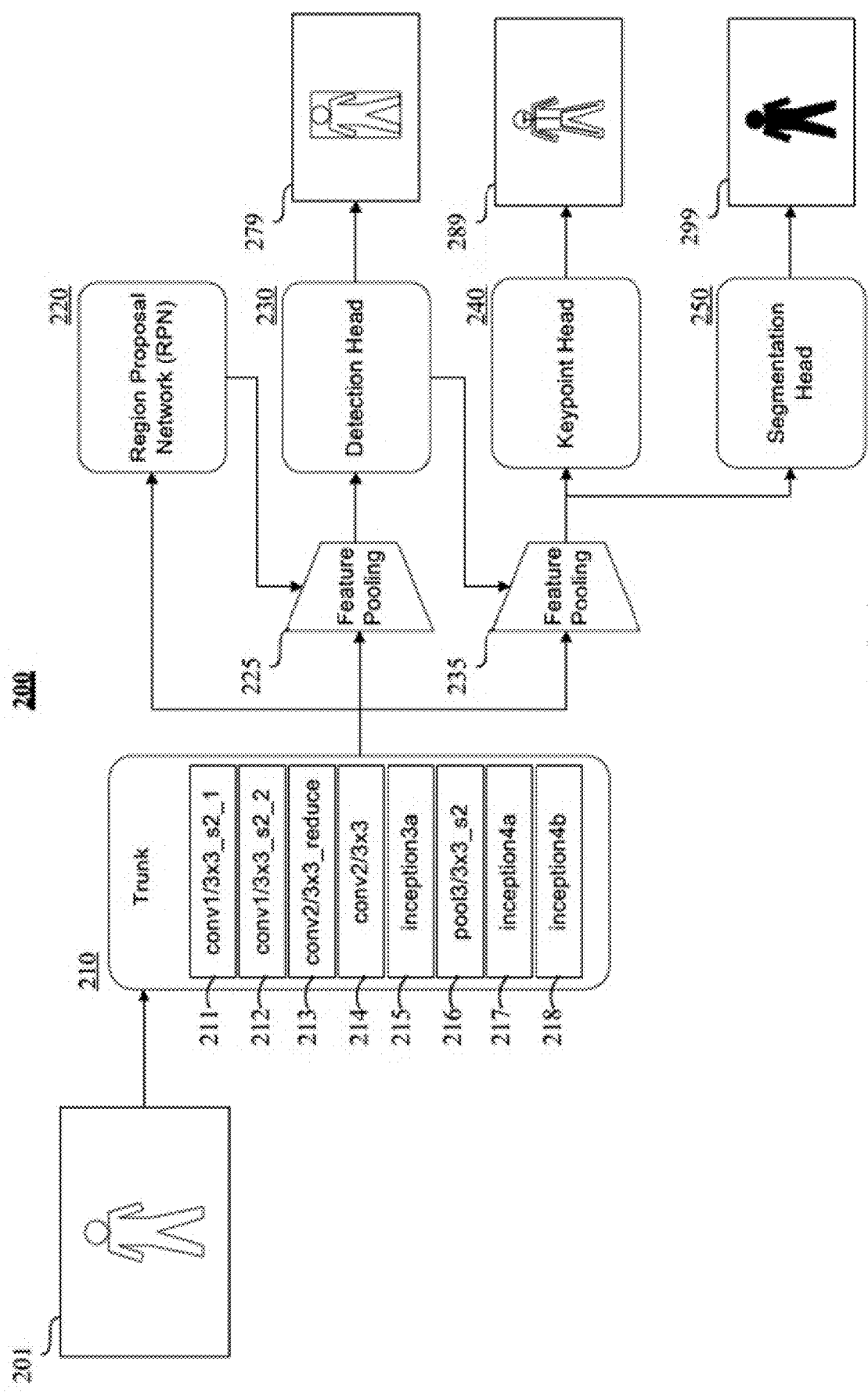
FIG. 2 illustrates an example architecture of a machine-learning model for predicting bounding boxes, segmentation masks, and keypoints.

FIG. 2 illustrates an example architecture of a machine-learning model 200 according to particular embodiments. The machine-learning model 200 is configured to take as input an image 201 or a preprocessed representation of the image, such as a three-dimensional matrix with dimensions corresponding to the image's height, width, and color channels (e.g., red, green, and blue). The machine-learning model 200 is configured to extract features of the image 201 and output an object detection indicator 279 (e.g., coordinates of a bounding box surrounding a person), keypoints 289 (e.g., representing the pose of a detected person), and/or segmentation mask 299 (e.g., identifying pixels that correspond to the detected person). The machine-learning model's 200 architecture is designed to be compact (thereby reducing storage and memory needs) and with reduced complexities (thereby reducing processing needs) so that it may produce sufficiently accurate and fast results on devices with limited resources to meet the demands of real-time applications (e.g., 10, 15, or 30 frames per second). Compared to conventional architectures, such as those based on ResNet or Feature Pyramid Networks (FPN), the architecture of the machine-learning model 200 is much smaller in size and could generate predictions much faster (e.g., roughly 100× faster).

In particular embodiments, the machine-learning model 200 includes several high-level components, including a backbone neural network, also referred to as a trunk 210, a region proposal network (RPN) 220, detection head 230, keypoint head 240, and segmentation head 250. Each of these components may be configured as a neural network. Conceptually, in the architecture shown, the trunk 210 is configured to process an input image 201 and prepare a feature map (e.g., an inception of convolutional outputs) that represents the image 201. The RPN 220 takes the feature map generated by the trunk 210 and outputs N number of proposed regions of interest (RoIs) that may include objects of interest, such as people, cars, or any other types of objects. The detection head 230 may then detect which of the N RoIs are likely to contain the object(s) of interest and output corresponding object detection indicators 279, which may define a smaller region, such as a bounding box, of the image 201 that contains the object of interest. In particular embodiments, a bounding box may be the smallest or near smallest rectangle (or any other geometric shape(s)) that is able to fully contain the pixels of the object of interest. For the RoIs deemed to be sufficiently likely to contain the object of interest, which may be referred to as target region definitions, the keypoint head 240 may determine their respective keypoint mappings 289 and the segmentation head 250 may determine their respective segmentation masks 299. In particular embodiments, the detection head 230, keypoint head 240, and segmentation head 250 may perform their respective operations in parallel. In other embodiments, the detection head 230, keypoint head 240, and segmentation head 250 may not perform their operations in parallel but instead adopt a multi-staged processing approach, which has the advantage of reducing computation and speeding up the overall operation. For example, the keypoint head 240 and segmentation head 250 may wait for the detection head 230 to identify the target region definitions corresponding to RoIs that are likely to contain the object of interest and only process those regions. Since the N number of RoIs initially proposed by the RPN 220 is typically much larger than the number of RoIs deemed sufficiently likely to contain the object of interest (e.g., on the order of 1000-to-1, 100-to-1, etc., depending on the image given), having such an architectural configuration could drastically reduce computations performed by the keypoint head 240 and segmentation head 250, thereby enabling the operation to be performed on devices that lack sufficient hardware resources (e.g., mobile devices).

Figure 3:
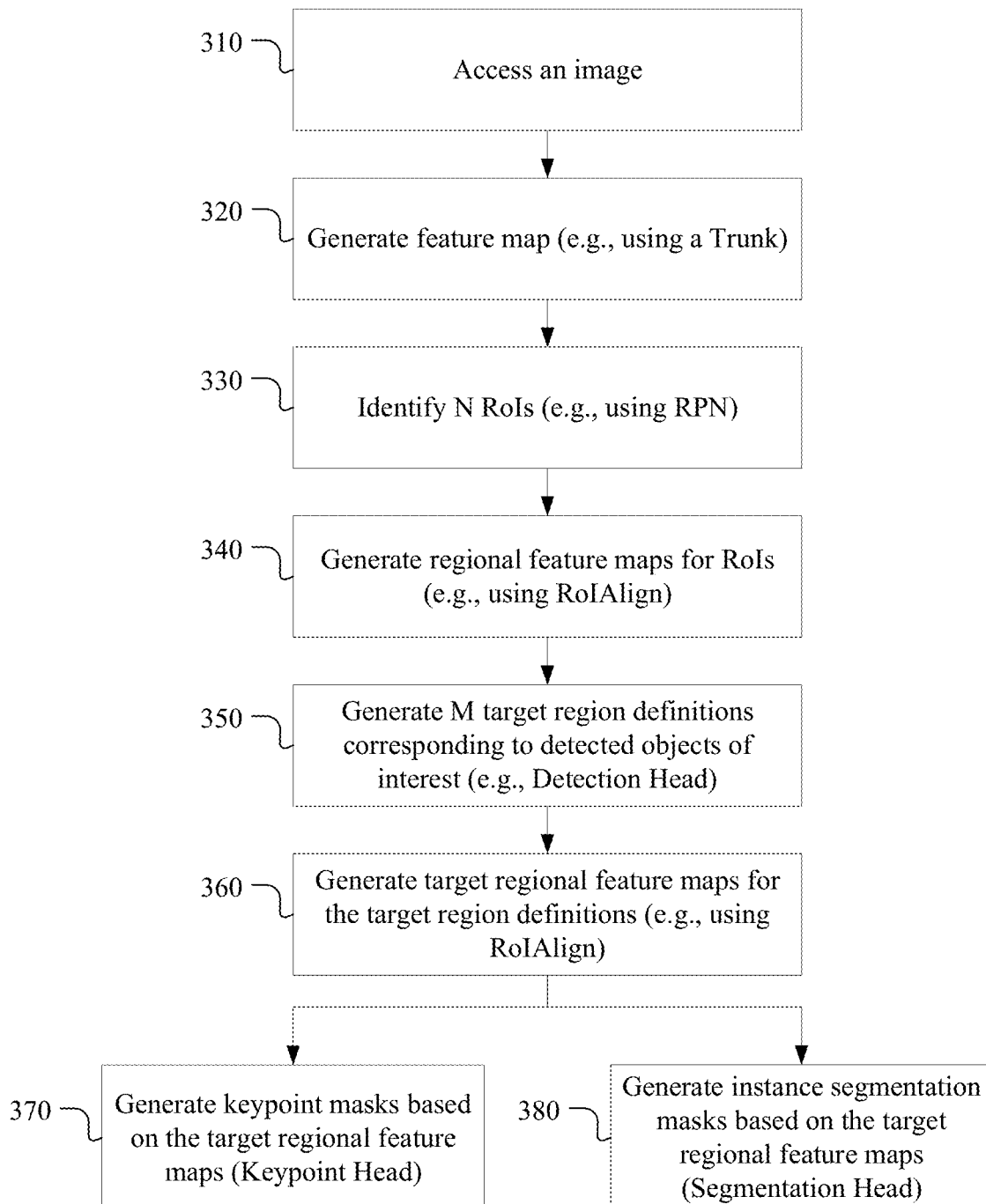
FIG. 3 illustrates an example method for detecting objects of interests in an image and generating instance segmentation masks and keypoint masks.

FIG. 3 illustrates an example method for detecting objects of interests (e.g., persons) in an image and generating instance segmentation masks and keypoint masks, in accordance with particular embodiments. The method may begin at step 310, where a system performing operations based on a machine-learning model may access an image or a frame of a video (e.g., as captured by a camera of the system, which may be a mobile device).

At step 320, the system may generate a feature map for the image using a trunk 210. In particular embodiments, the trunk 210 may be considered as the backbone neural network that learns to represent images holistically and is used by various downstream network branches that may be independently optimized for different applications/tasks (e.g., the RPN 220, detection head 230, keypoint head 240, and segmentation head 250). Conceptually, the trunk 210 is shared with each of the downstream components (e.g., RPN 220, detection head 230, etc.), which significantly reduces computational cost and resources needed for running the overall model.

The trunk 210 contains multiple convolutional layers and generates deep feature representations of the input image. In particular embodiments, the trunk 210 may have a compact architecture that is much smaller compared to ResNet and/or other similar architectures. In particular embodiments, the trunk 210 may include four (or fewer) convolution layers 211, 212, 213, 214, three (or fewer) inception modules 215, 217, 218, and one pooling layer (e.g., max or average pooling) 216. In particular embodiments, each of the convolutional layers 211, 212, 213, 214 may use a kernel size of 3×3 or less. In particular, each input image to the trunk 210 may undergo, in order, a first convolution layer 211 (e.g., with 3×3 kernel or patch size, stride size of 2, and padding size of 1), a second convolution layer 212 (e.g., with 3×3 kernel or patch size, stride size of 2, and padding size of 2), a third convolution layer 213 (e.g., with 3×3 kernel or patch size and dimensionality reduction), another convolution layer 214 (e.g., with 3×3 kernel or patch size), a first inception module 215, a max or average pooling layer 216 (e.g., with 3×3 patch size and stride 2), a second inception module 217, and a third inception module 218.

In particular embodiments, each of the inception modules 215, 217, 218 may take the result from its previous layer, perform separate convolution operations on it, and concatenate the resulting convolutions. For example, in one inception module, which may include dimension reduction operations, the result from the previous layer may undergo: (1) a 1×1 convolution, (2) a 1×1 convolution followed by a 3×3 convolution, (3) a 1×1 convolution followed by a 5×5 convolution, and/or (4) a 3×3 max pooling operation followed a 1×1 dimensionality reduction filter. The results of each may then undergo filter concatenation to generate the output of the inception module. In the embodiment described above, the convolutions performed in the inception module use kernel sizes of 5×5 or less; no 7×7 or larger convolution is used in the inception module, which helps reduce the size of the neural net. By limiting the convolution in the inception modules to 5×5 or less, the resulting convolutions and feature maps would be smaller, which in turn means less computation for the subsequent networks (including the networks associated with the downstream components, such as the RPN 220, detection head 230, etc. Although no 7×7 convolution is used in this particular embodiment, 7×7 convolutions may be used in other embodiments.

Referring again to FIG. 3, at step 330, the system in accordance with particular embodiments may identify a plurality of RoIs in the feature map. In particular embodiments, the output of the trunk 210 may be provided to the RPN 220, which may be trained to output proposed candidate object bounding boxes or other types of indication of potential RoIs. In particular embodiments, the candidates may have predefined scales and aspect ratios (e.g., anchor points). The N number of proposed regions of interest (RoIs) output by the RPN 220 may be large (e.g., in the thousands or hundreds), as the RoIs may not necessarily be limited to those that relate to the type(s) of object of interest. For example, the RoIs may include regions that correspond to trees, dogs, cars, houses, and people, even though the ultimate object of interest is people. In particular embodiments, the N RoIs from the RPN 220 may be processed by the detection head 230 to detect RoIs that correspond to the object of interest, such as people.

Referring again to FIG. 3, at step 340, the system according to particular embodiments may generate, based on the feature map, a plurality of regional feature maps for the RoIs, respectively. For example, particular embodiments may extract features from the output of the trunk 210 for each RoI, as represented by block 225 in FIG. 2, to generate corresponding regional feature maps (i.e., a regional feature map is a feature map that correspond to a particular RoI). Conventionally, a technique called RoIPool may be used. RoIPool may first quantizes a floating-number RoI to the discrete granularity of the feature map. This quantized RoI may be then subdivided into spatial bins which are themselves quantized. The feature values covered by each bin may then be aggregated (usually by max pooling). Quantization may be performed, e.g., on a continuous coordinate x by computing [x/16], where 16 is a feature map stride and [.] is rounding; likewise, quantization is performed when dividing into bins (e.g., 7×7). In effect, quantizing the sampling region in this manner is conceptually similar to "snapping" the region to a uniform grid segmenting the feature map based on the stride size. For example, if an edge of a RoI is between gridlines, the corresponding edge of the actual region that is sampled may be "snapped" to the closest gridline (by rounding). These quantizations introduce misalignments between the RoI and the extracted features. While this may not impact classification, which is robust to small translations, it has a large negative effect on predicting pixel-accurate masks.

To address this, particular embodiments, referred to as RoIAlign, removes the harsh quantization of RoIPool by properly aligning the extracted features with the input. This may be accomplished by avoiding any quantization of the RoI boundaries or bins (i.e., use x/16 instead of [x/16]). Particular embodiments may use bilinear interpolation to compute the exact values of the input features at four regularly sampled locations in each RoI bin, and aggregate the result (using max or average). Through RoIAlign, the system may generate a regional feature map of a predefined dimension for each of the RoIs. Particular embodiments may sample four regular locations, in order to evaluate either max or average pooling. In fact, interpolating only a single value at each bin center (without pooling) is nearly as effective. One could also sample more than four locations per bin, which was found to give diminishing returns.

With RoIAlign, the bilinear interpolation used in the feature pooling 225 process is more accurate but requires more computation. In particular embodiments, the bilinear interpolation process may be optimized by precomputing the bilinear-interpolation weights at each position in the grid across batches.

Referring again to FIG. 3, at step 350, the system may process the plurality of regional feature maps (e.g., generated using RoIAlign) using the detection head to detect ones that correspond to objects of interest depicted in the input image and generate corresponding target region definitions (e.g., a bounding boxes) associated with locations of the detected objects. For example, after pooling features from the output of the trunk 210 for each RoI, the feature pooling process 225 (e.g., RoIAlign) may pass the results (i.e., regional feature maps of the RoIs) to the detection head 230 so that it may detect which RoIs correspond to the object of interest, such as people. The detection head 230 may be a neural network with a set of convolution, pooling, and fully-connected layers. In particular embodiments, the detection head 230 may take as input the pooled features of each RoI, or its regional feature map, and perform a single inception operation for each regional feature map. For example, each regional feature map may undergo a single inception module transformation, similar to those described above (e.g., concatenating 1×1 convolution, 3×3 convolution, and 5×5 convolution results), to produce a single inception block. In particular embodiments, the inception module may perform convolutional operations using kernel sizes of 5×5 or fewer, which is different from conventional modules where 7×7 convolutional operations are performed. Compared to other ResNet-based models that use multiple inception blocks, configuring the detection head 230 to use a single inception block significantly reduces the machine-learning model's size and runtime.

In particular embodiments, the detection head 230 may be configured to process the inception block associated with a given RoI and output a bounding box and a probability that represents a likelihood of the RoI corresponding to the object of interest (e.g., corresponding to a person). In particular embodiments, the inception block may first be processed by average pooling, and the output of which may be used to generate (1) a bounding-box prediction (e.g., using a fully connected layer) that represents a region definition for the detected object (this bounding box coordinates may more precisely define the region in which the object appears), (2) a classification (e.g., using a fully connected layer), and/or (3) a probability or confidence score (e.g., using Softmax function). Based on the classification and/or probability, the detection head 230 may determine which of the RoIs likely correspond to the object of interest. In particular embodiments, all N RoI candidates may be sorted based on the detection classification/probability. The top M RoI, or their respective region definitions (e.g., which may be refined bounding boxes with updated coordinates that better surround the objects of interest), may be selected based on their respective score/probability of containing the objects of interest (e.g., people). The selected M region definitions may be referred to as target region definitions. In other embodiments, the RoI selection process may use non-maximal suppression (NMS) to help the selection process terminate early. Using NMS, candidate RoIs may be selected while they are being sorted, and once the desired M number of RoIs (or their corresponding region definitions) have been selected, the selection process terminates. This process, therefore, may further reduce runtime.

In particular embodiments, once the detection head 230 selects M target region definitions that are likely to correspond to instances of the object of interest (e.g., people), it may pass the corresponding target region definitions (e.g., the refined bounding boxes) to the keypoint head 240 and segmentation head 250 for them to generate keypoint maps 289 and segmentation masks 299, respectively. As previously mentioned, since the M number of region definitions that correspond to people is typically a lot fewer than the N number of initially-proposed RoIs (i.e., M<<N), filtering in this manner prior to having them processed by the keypoint head 240 and segmentation head 250 significantly reduces computation.

In particular embodiments, before processing the M target region definitions using the keypoint head 240 and segmentation head 250, corresponding regional feature maps may be generated (e.g., using RoIAlign) since the M target region definitions may have refined bounding box definitions that differ from the corresponding RoIs. Referring to FIG. 3, at step 360, the system may generate, based on the target region definitions, corresponding target regional feature maps by sampling the feature map for the image. For example, at the feature pooling process 235 shown in FIG. 2, the system may pool features from the feature map output by the trunk 210 for each of the M target region definitions selected by the detection head 230. The feature pooling block 235 may perform operations similar to those of block 225 (e.g., using RoIAlign), generating regional feature maps for the M target region definitions, respectively. In particular embodiments, the bilinear interpolation process may also be optimized by precomputing the bilinear-interpolation weights at each position in the grid across batches.

Referring to FIG. 3, at step 370, the system may then generate a keypoint mask associated with each detected person (or other object of interest) by processing the target regional feature map using a third neural network. For example, in FIG. 2, the feature pooling process 235 may pass the pooled features (the target regional feature maps) to the keypoint head 240 so that it may, for each of the M target region definitions, detect keypoints 289 that map to the structure of the detected instance of the object of interest (e.g., 19 points that map to a person's joints, head, etc., which may represent the person's pose). In particular embodiments, the keypoint head 240 may process each input target region definition using a single inception module transformation similar to those described above (e.g., concatenating 1×1 convolution, 3×3 convolution, and 5×5 convolution results) to produce a single inception block. Compared to other ResNet-based models that use multiple inception blocks, configuring the keypoint head 240 to use a single inception block significantly reduces the machine-learning model's size and runtime. The inception block may then be further processed through the neural network of the keypoint head 240 to generate the keypoint masks.

Particular embodiments may model a keypoint's location as a one-hot mask, and the keypoint head 240 may be tasked with predicting K masks, one for each of K keypoint types (e.g., left shoulder, right elbow, etc.). For each of the K keypoints of an instance, the training target may be a one-hot m×m binary mask in which a single pixel is labeled as a foreground and the rest being labeled as backgrounds (in which case the foreground would correspond to the pixel location of the body part, such as neck joint, corresponding to the keypoint). During training, for each visible ground-truth keypoint, particular embodiments minimize the cross-entropy loss over an $m^2$-way softmax output (which encourages a single point to be detected). In particular embodiments, the K keypoints may still be treated independently. In particular embodiments, the inception block may be input into a deconvolution layer and 2× bilinear upscaling, producing an output resolution of 56×56. In particular embodiments, a relatively high-resolution output (compared to masks) may be required for keypoint-level localization accuracy. In particular embodiments, the keypoint head 240 may output the coordinates of predicted body parts (e.g., shoulders, knees, ankles, head, etc.) along with a confidence score of the prediction. In particular embodiments, the keypoint head 240 may output respective keypoint masks and/or heat maps for the predetermined body parts (e.g., one keypoint mask and/or heat map for the left knee joint, another keypoint mask and/or heat map for the right knee, and so forth). Each heat map may include a matrix of values corresponding to pixels, with each value in the heat map representing a probability or confidence score that the associated pixel is where the associated body part is located.

Referring to FIG. 3, at step 380, the system may additionally or alternatively generate an instance segmentation mask associated with each detected person (or other object of interest) by processing the target regional feature map using a fourth neural network. For example, the feature pooling process 235 shown in FIG. 2 may additionally or alternatively pass the pooled features (i.e., the target regional feature maps) to the segmentation head 250 so that it may, for each of the M RoIs, generate a segmentation mask 299 that identifies which pixels correspond to the detected instance of the object of interest (e.g., a person). In particular embodiments, depending on the needs of an application using the model 200, only the keypoint head 240 or the segmentation head 250 may be invoked. In particular embodiments, the keypoint head 240 and the segmentation head 250 may perform operations concurrently to generate their respective masks. In particular embodiments, the segmentation head may be configured to process each input regional feature map using a single inception module. For example, the pooled features (or regional feature map for RoIAlign) of each of the M region definitions may undergo a single inception module transformation similar to those described above (e.g., concatenating 1×1 convolution, 3×3 convolution, and 5×5 convolution results) to produce a single inception block. Compared to other ResNet-based models that use multiple inception blocks, configuring the keypoint head 240 to use a single inception block significantly reduces the machine-learning model's size and runtime. The inception block may then be further processed through the neural network of the segmentation head 250 to generate the segmentation mask.

In particular embodiments, a segmentation mask encodes a detected object's spatial layout. Thus, unlike class labels or box offsets that are inevitably collapsed into short output vectors by fully connected (fc) layers, extracting the spatial structure of masks can be addressed naturally by the pixel-to-pixel correspondence provided by convolutions. Particular embodiments may predict an m×m mask from each RoI using a fully convolutional neural network (FCN). This may allow each layer in the segmentation head 250 to maintain the explicit m×m object spatial layout without collapsing it into a vector representation that lacks spatial dimensions. Unlike previous methods that resort to fc layers for mask prediction, particular embodiments may require fewer parameters and may be more accurate. This pixel-to-pixel behavior may require RoI features, which themselves are small feature maps, to be well aligned to faithfully preserve the explicit per-pixel spatial correspondence. The aforementioned feature pooling process termed RoIAlign (e.g., used in the feature pooling layers 225 and 235) may address this need.

Particular embodiments may repeat one or more steps of the process of FIG. 3, where appropriate. Although this disclosure describes and illustrates particular steps of the process of FIG. 3 as occurring in a particular order, this disclosure contemplates any suitable steps of the process of FIG. 3 occurring in any suitable order. Moreover, although this disclosure describes and illustrates an example method for processing an image for objects of interests, including the particular steps of the process shown in FIG. 3, this disclosure contemplates any suitable process for doing so, including any suitable steps, which may include all, some, or none of the steps of the process shown in FIG. 3, where appropriate. Furthermore, although this disclosure describes and illustrates particular components, devices, or systems carrying out particular steps of the process of FIG. 3, this disclosure contemplates any suitable combination of any suitable components, devices, or systems carrying out any suitable stages of the process of FIG. 3.

Figure 4:
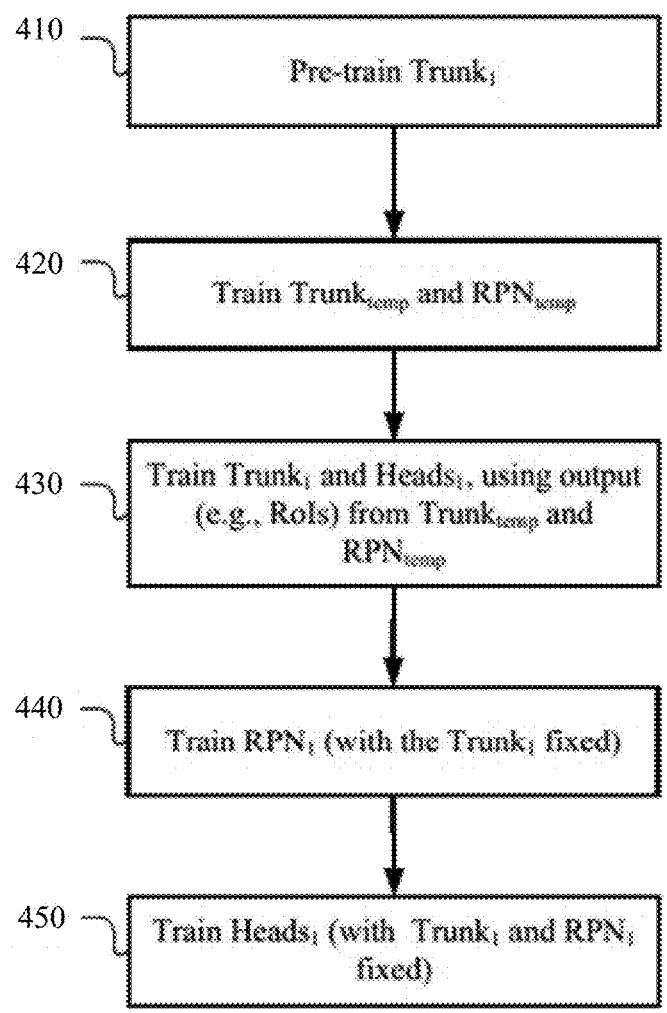
FIG. 4 illustrates an example process for training the machine-learning model in accordance with particular embodiments

FIG. 4 illustrates an example process for training the machine-learning model in accordance with particular embodiments. In particular embodiments, a multi-stage training process may be used to train the machine-learning model, with each stage focusing on training different components of the model. The training process may begin at stage 410, where the trunk model (referenced as $Trunk_1$ in FIG. 4) is pre-trained to perform a classification task. For example, the trunk may be trained to classify images into any number of categories (e.g., 100, 200 categories). The training dataset may include image samples with labeled/known categories. In particular embodiments, the training process, including the training dataset, may be similar to those used for training ResNet or other similar networks for generating feature map representations of images. This pre-training process helps the trunk model obtain initialization parameters.

At stage 420, a temporary trunk (referenced as $Trunk_{temp}$ in FIG. 4) and a temporary RPN (referenced as $RPN_{temp}$ in FIG. 4) may be trained together to generate a temporary functional model for generating RoI candidates, in accordance with particular embodiments. Once trained, $Trunk_{temp}$ and $RPN_{temp}$ in particular embodiments are used to assist with the subsequent training process and are not themselves included in the machine-learning model 200. In particular embodiments, the temporary $Trunk_{temp}$ may be initialized to have the same parameters as those of $Trunk_1$ from stage 410. Rather than initializing $Trunk_1$ in stage 410 and using the result to initialize $Trunk_{temp}$, one skilled in the art would recognize that the order may be switched (i.e., $Trunk_{temp}$ may be initialized in stage 410 and the initialized $Trunk_{temp}$ may be used to initialize $Trunk_1$). The training dataset at stage 420 may include image samples. Each image sample may have a corresponding ground truth or label, which may include bounding boxes (e.g., represented by anchors) or any other suitable indicators for RoIs that contain foreground/background objects in the image sample. In particular embodiments, the RPN may be trained in the same manner as in Faster R-CNN. For example, the RPN may be trained to generate k anchors (e.g., associated with boxes of predetermined aspect ratios and sizes) for each sampling region and predict a likelihood of each anchor being background or foreground. Once trained, $Trunk_{temp}$ and $RPN_{temp}$ would be configured to process a given image and generate candidate RoIs.

In particular embodiments, at stage 430, $Trunk_1$ and the various downstream heads (e.g., the detection head, keypoint head, and segmentation head), referred to as $Heads_1$ in FIG. 4. The training dataset for this stage may include image samples, each having ground truths or labels that indicate (1) known bounding boxes (or other indicator types) for object instances of interest (e.g., people) in the image for training the detection head, (2) known keypoints (e.g., represented as one-hot masks) for object instances of interest in the image for training the keypoint head, and (3) known segmentation masks for object instances of interest in the image for training the segmentation head.

In particular embodiments, each training image sample, during training, may be processed using the temporary $Trunk_{temp}$ and $RPN_{temp}$ trained in stage 420 to obtain the aforementioned N candidate RoIs. These N RoIs may then be used for training the $Trunk_1$ and the various $Heads_1$. For example, based on the N RoI candidates, the detection head may be trained to select RoI candidates that are likely to contain the object of interest. For each RoI candidate, the machine-learning algorithm may use a bounding-box regressor to process the feature map associated with the RoI and its corresponding ground truth to learn to generate a refined bounding-box that frames the object of interest (e.g., person). The algorithm may also use a classifier (e.g., foreground/background classifier or object-detection classifier for persons or other objects of interest) to process the feature map associated with the RoI and its corresponding ground truth to learn to predict the object's class. In particular embodiments, for the segmentation head, a separate neural network may process the feature map associated with each RoI, generate a segmentation mask (e.g., which may be represented as a matrix or grid with binary values that indicate whether a corresponding pixel belongs to a detected instance of the object or not), compare the generated mask with a ground-truth mask (e.g., indicating the true pixels belonging to the object), and use the computed errors to update the network via backpropagation. In particular embodiments, for the keypoint head, another neural network may process the feature map associated with each RoI, generate a one-hot mask for each keypoint of interest (e.g., for the head, feet, hands, etc.), compare the generated masks with corresponding ground-truth masks (e.g., indicating the true locations of the keypoints of interest), and use the computed errors to update the network via backpropagation. In particular embodiments, the different heads may be trained in parallel.

In particular embodiments, at stage 440, after $Trunk_1$ and the various $Heads_1$ of the machine-learning model have been trained in stage 430, the $RPN_1$ of the model may be trained with $Trunk_1$ being fixed (i.e., the parameters of $Trunk_1$ would remain as they were after stage 430 and unchanged during this training stage). The training dataset at this stage may again include image samples, each having a corresponding ground truth or label, which may include bounding boxes or any other suitable indicators for RoIs appearing in the image sample. Conceptually, this training stage may refine or tailor the $RPN_1$ to propose regions that are particularly suitable for human detection.

At stage 450, once $RPN_1$ has been trained, the various $Heads_1$ (e.g., detection head, keypoint head, and segmentation head) may be retrained with both $Trunk_1$ and $RPN_1$ fixed, in accordance with particular embodiments (i.e., the parameters of $Trunk_1$ and $RPN_1$ would remain as they were after stage 440 and unchanged during this training stage). The training dataset may be similar to the one used in stage 430 (e.g., each training image sample has known ground-truth bounding boxes, keypoints, and segmentation masks). The training process may also be similar to the process described with reference to stage 430, but now $Trunk_1$ would be fixed and the N candidate RoIs would be generated by the trained (and fixed) $Trunk_1$ and $RPN_1$, rather than the temporary $Trunk_{temp}$ and $RPN_{temp}$.

Referring back to FIG. 2, once the machine-learning model 200 has been trained, at inference time it may be given an input image 201 and output corresponding bounding boxes 279, keypoints 289, and segmentation masks 299 for instances of objects of interest appearing in the image 201. In particular embodiments, the trained model 200 may be included in applications and distributed to different devices with different system resources, including those with limited resources, such as mobile devices. Due to the compact model architecture and the various optimization techniques described herein, the model 200 would be capable of performing sufficiently despite the limited system resources to meet the real-time needs of the application, if applicable.

Particular embodiments may repeat one or more stages of the training process of FIG. 4, where appropriate. Although this disclosure describes and illustrates particular stages of the training process of FIG. 4 as occurring in a particular order, this disclosure contemplates any suitable steps of the training process of FIG. 4 occurring in any suitable order. Moreover, although this disclosure describes and illustrates an example method for training the machine-learning model including the particular stages of the process shown in FIG. 4, this disclosure contemplates any suitable process for training the machine-learning model including any suitable stages, which may include all, some, or none of the stages of the process shown in FIG. 4, where appropriate. Furthermore, although this disclosure describes and illustrates particular components, devices, or systems carrying out particular stages of the process of FIG. 4, this disclosure contemplates any suitable combination of any suitable components, devices, or systems carrying out any suitable stages of the process of FIG. 4.

In particular embodiments, at inference time, the trained machine-learning model may be running on a mobile device with limited hardware resources. Compared with mobile CPU, running operations on mobile GPU may provide significant speed-up. Certain mobile platforms may provide third-party GPU processing engines (e.g., Qualcomm® Snapdragon™ Neural Processing Engine (SNPE)) that allow the trained machine-learning model to utilize the various computing capabilities available (e.g., CPU, GPU, DSP). Such third-party processing engines, however, may have certain limitations that would result in suboptimal runtime performance of the machine-learning model.

Figure 5A:
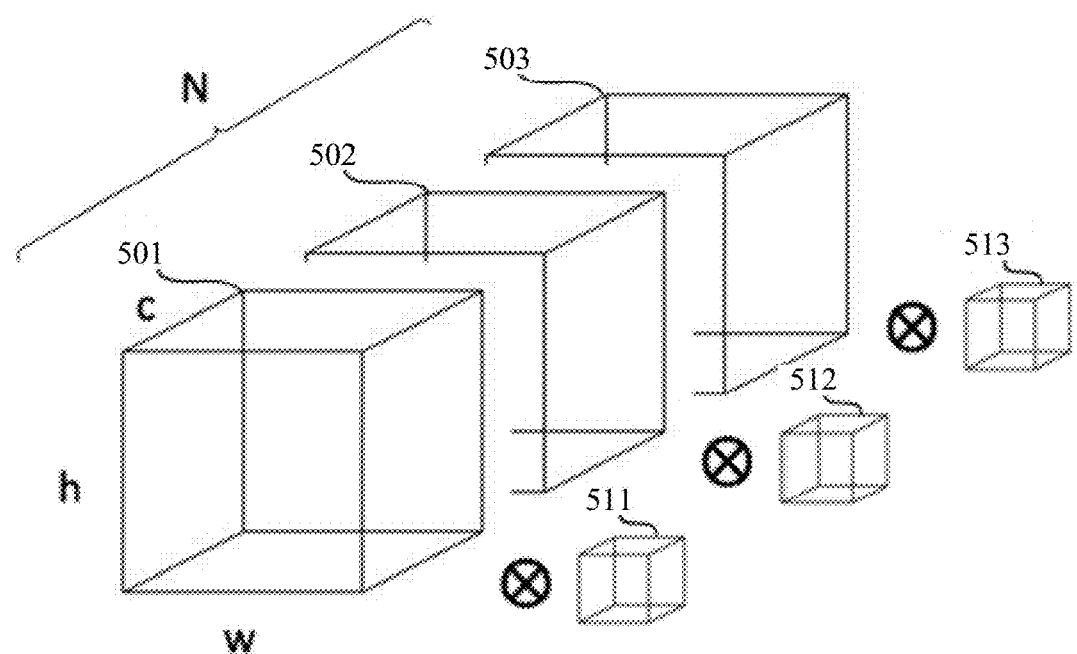
FIG. 5A illustrates an example iterative process for performing convolutions on feature maps.

One issue with third-party processing engines such as SNPE is that it may only support optimized processing for three-dimensional data (hereinafter referred to as 3D tensors). As previously discussed, the RPN is trained to process a given input image and generate N candidate RoIs, and the detection head is trained to select M RoIs. Each of the RoIs may have three-dimensional feature maps (i.e., channel C, height H, and width W). As such, the model needs to process four-dimensional data. Since processing engines such as SNPE only supports three-dimensional convolution processing, one way to process the feature maps is to process the feature maps of the N RoIs (or M, depending on the stage of the inference process) iteratively, such as using a FOR-loop. The FOR-loop for performing sequential convolutions, for instance, may be as follows:

for i in range (0, N−1):
        conv (B[i, C, W, H], K);

where B[i, C, W, H] represents the feature maps of the i-th RoI in the N RoIs and K represents the kernel or patch used in the convolution. FIG. 5A illustrates this process by showing three RoI feature maps 501, 502, 503 undergoing convolution operations with three identical kernel instances 511, 512, 513, respectively. In this case, the FOR-loop and the tensor splitting may be performed using the device's CPU, and the convolution is performed using the device's GPU. So in each iteration, data has to be copied between CPU memory and GPU memory, which creates significant overhead. Further, this iterative process (which also means launching the SNPE environment repeatedly), coupled with the relatively small feature maps of the RoIs, is not an efficient use of SNPE's parallel processing features (SNPE or other third-party processing engines may have optimization features for larger feature maps).

Figure 5B:
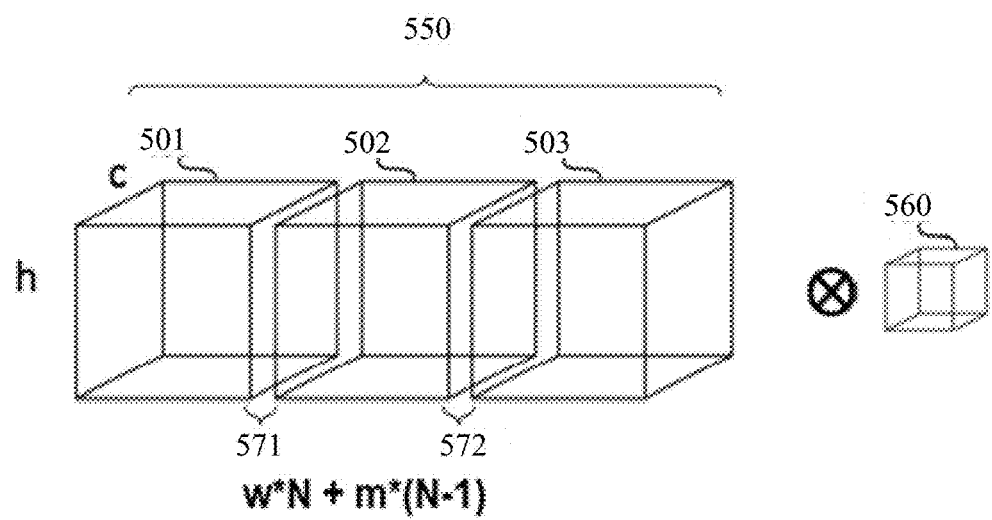
FIG. 5B illustrates an example process for performing convolutions on tiled feature maps.

To avoid the aforementioned issues and improve performance, particular embodiments utilize a technique that transforms the 4D tensor (i.e., the feature maps of the N or M RoIs) into a single 3D tensor so that SNPE may be used to perform a single optimized convolution operation on all the feature maps. FIG. 5B illustrates an example where the N=3 three-dimensional feature maps of the RoIs 501, 502, 503 are tiled together to form one large 3D tensor 550. In particular embodiments, padding data may be inserted between adjacent feature maps to prevent incorrect sampling (e.g., preventing, during convolution, the kernel being applied to two different but neighboring RoI feature maps). As illustrated in FIG. 5B, padding 571 may be inserted between feature map 501 and feature map 502, and padding 572 may be inserted between feature map 502 and feature map 503. In particular embodiments, the padding size may depend on the kernel 560 size. For example, the padding size may be equal to or larger than a dimension of the kernel 560 (e.g., if the kernel is 3×3, the padding may be 3 or more). In this particular tiling scenario, the resulting 3D tensor 550 may have the dimension C×H×(W*N+m*(N−1)), where m represents the width of the padding data. Thus, in this case, the C and H dimensions of the tensor 550 may remain the same relative to those of each of the regional feature maps 501-503, and the W dimension of tensor 550 may be greater than the combined W dimensions of the regional feature maps 501-503.

Particular manners of tiling may be more efficient than others, depending on how the combined tensor 550 is to be processed. For example, if the operation to be performed is convolution (e.g., in the initial inception module of each of the heads 230, 240, or 250), the feature maps may be tiled in a certain dimension to improve subsequent convolution efficiency (e.g., by improving cache-access efficiency and reducing cache misses). The regional feature map of an RoI can usually be thought of as being three-dimensional, with a height size (H), a width size (W), and a channel size (C). Since the RPN 220 outputs N RoIs, the dimensionality of the N RoIs would be four-dimensional (i.e., H, W, C, and N). The corresponding data representation may be referred to as 4D tensors. In particular embodiments, the 4D tensors may be stored in a data structure that is organized as NCHW (i.e., the data is stored in cache-first order, or in the order of batch, channel, height, and weight). This manner of data storage may provide the detection head with efficient cache access when performing convolution. Similarly, when the segmentation head and/or keypoint head performs convolutions on the regional feature maps of the M region definitions from the detection head, the data may be stored in MCHW order. However, when it comes to the aforementioned feature pooling 225/235 process (e.g., RoIAlign), cache access is more efficient in NHWC or MHWC order, because it can reduce cache miss and utilize SIMD (single instruction multiple data). Thus, in particular embodiments, the feature pooling 225 or 235 process may include a step that organizes or transforms a 4D tensor into NHWC format. This order switching could speed up the feature pooling 225 process significantly.

FIG. 5B illustrates an example where the feature maps of the RoIs are tiled together in a row to form a single long 3D tensor 550. In other words, only a single dimension is being expanded. However, the feature maps may also be tiled in any other configurations, so that two or three dimensions are expanded. To illustrates, in one example scenario, there may be N=12 feature maps. If no padding is inserted, arranging the feature maps in a row may yield a 3D tensor with the dimensions C*1×H*1×W*12. If the feature maps are arranged in a manner that expands two dimensions, the resulting 3D tensor may have the dimensions C*1×H*4× W*3. If the feature maps are arranged in a manner that expands three dimensions, the resulting 3D tensor may have the dimensions C*2×H*3×W*2.

In particular embodiments, it may be more desirable to generate a large 3D tensor with a larger aspect ratio, such as expanding in only one dimension (i.e., in a row), in order to minimize padding (which in turn minimizes the size of the resulting 3D tensor). Since padding is added between adjacent feature maps, minimizing the surface area of feature maps that are adjacent to other feature maps would result in a reduced need for padding. To illustrate, if N=4, tiling the four feature map tiles in a row may need 3*m padding (i.e., one between the first and second tiles, one between the second and third tiles, and one between the third and fourth tiles). However, if the four feature maps tiles are tiled in a 2×2 configuration, the number of paddings needed would be 4*m (i.e., one between the top-left tile and the top-right tile, one between the top-right tile and the bottom-right tile, one between the bottom-right tile and the bottom-left tile, and one between the bottom-left tile and the top-left tile). Thus, in particular embodiments, additional optimization may be gained by arranging the feature maps in a row (i.e., expanding in one dimension only).

Figure 6:
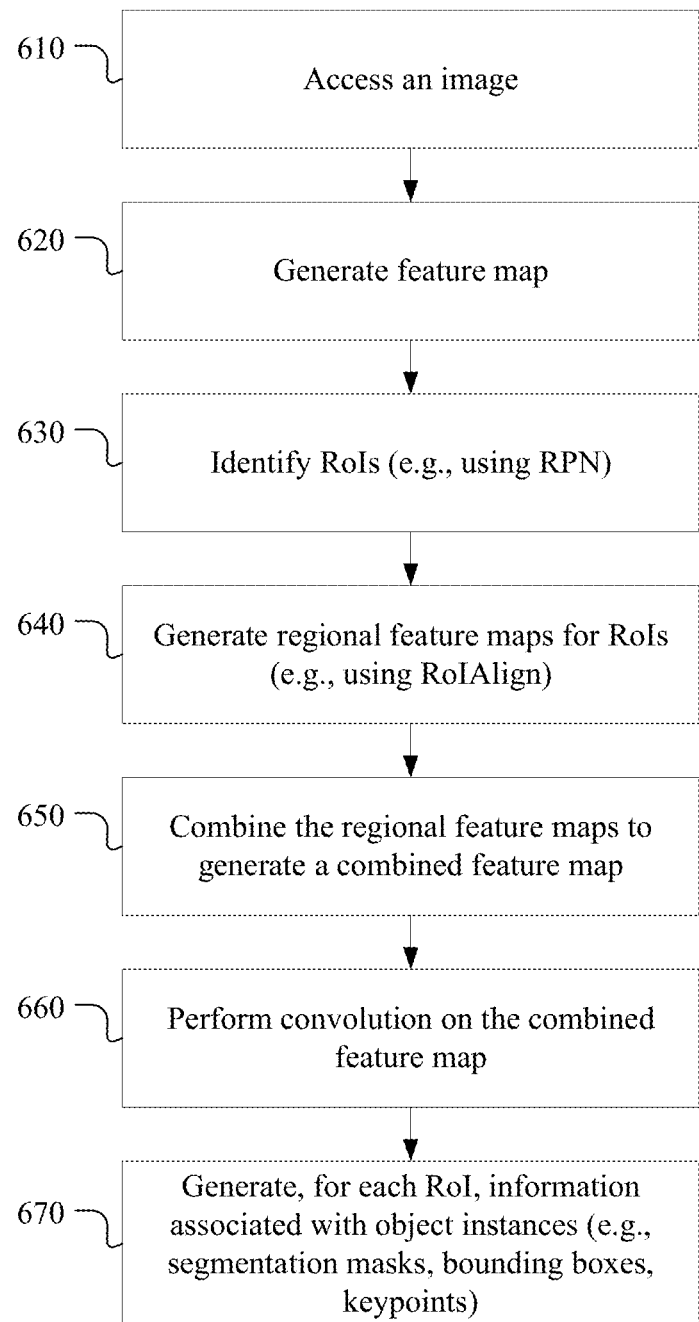
FIG. 6 illustrates an example method for optimizing convolutional operations on feature maps of regions of interests.

FIG. 6 illustrates an example method for optimizing convolutional operations on feature maps of RoIs. The method may begin at step 610, where a computing system (e.g., a mobile device, laptop, or any other device used at inference time) may access an image of interest. The image, for example, may be a still image posted on a social network or a frame in a live video (e.g., captured in an augmented reality or virtual reality application). IPE, the system may need to obtain inference results in real-time or near real-time. For example, an augmented reality application or autonomous vehicle may need to determine the instance segmentation masks of people or vehicles captured in an image/video. The optimizations of the machine-learning model described herein enable computing devices, even those with relatively limited hardware resources (e.g., mobile phones), to generate results quickly to meet application requirements.

At step 620, the system may generate a feature map that represents the image. IPE, the system may use the backbone neural network, such as the trunk 210 described herein, to generate the feature map. While other types of backbones (e.g., ResNet, Feature Pyramid Network, etc.) may alternatively be used, embodiments of the trunk 210 provide the advantage of, e.g., not requiring significant hardware resources (e.g., CPU, GPU, cache, memory, etc.) to generate feature maps within stringent timing constraints. Embodiments of the trunk enables applications running on mobile platforms, for example, to take advantage of real-time or near real-time instance detection, classification, segmentation, and/or keypoint generation.

At step 630, the system may identify a regions of interest (RoIs) in the feature map. IPE, the RoIs may be identified by a region proposal network (RPN), as described herein.

At step 640, the system may generate regional feature maps for the RoIs, respectively. For example, the system may use sampling methods such as RoIPool or RoIAlign to sample an RoI and generate a representative regional feature map. Each of the M regional feature maps generated may have three dimensions (e.g., corresponding to the regional feature map's height, width, and channels). IPE, the regional feature maps may have equal dimensions (e.g., same height, same width, and same channels).

At step 650, the system may generate a combined regional feature map by combining the M regional feature maps into one. As described previously, the regional feature maps (or 3D tensors) may effectively be tiled together to form a larger 3D tensor. IPE, the combined regional feature map may be formed by tiling the regional feature maps in a single dimension (e.g., in a row). For example, a first dimension and a second dimension of the combined regional feature map may be equal to the first dimension and the second dimension of each of the plurality of regional feature maps, respectively, with the third dimension of the combined regional feature map being equal to or larger than (e.g., due to added paddings) a combination of the respective third dimensions of the regional feature maps (e.g., the regional feature maps may be stacked in the channel direction, resulting in the combined regional feature map retaining the same height and width as those of an individual regional feature map, but with a larger channel depth). IPE, the combined regional feature map may be formed by tiling the regional feature maps in two dimensions (e.g., 6 regional feature maps may be tiled in a 2×3 configuration). For example, if the regional feature maps are tiled in both the height and width dimensions, the resulting combined regional feature map's height and width may be larger than a single regional feature map, but its channel would remain the same. IPE, the combined regional feature map may be formed by tiling the regional feature maps in all three dimensions. In this case, the height, width, and channel of the combined regional feature map may be larger than those of a single regional feature map.

IPE, to prevent cross sampling from feature maps of different RoIs, the system may insert padding data between adjacent pairs of regional feature maps in the combined regional feature map. IPE, the size of the padding between each adjacent pair of regional feature maps may be at least as wide as a kernel size used by the one or more convolutional layers.

At step 660, the system may process the combined regional feature map using one or more convolutional layers to generate another combined regional feature map. For example, the system may use a neural processing engine, such as SNPE, to perform the convolutional operations on the combined regional feature map to generate a second combined regional feature map. By combining M regional feature maps into one, the system is able to process the M maps using existing functionalities of neural processing engines, which may be configured to perform convolutional operations only on three-dimensional tensors, thereby taking full advantage of the optimizations offered by such engines.

At step 670, the system may generate, for each of the RoIs, information associated with an object instance based on a portion of the second combined regional feature map (i.e., the result of the convolutional operations performed in step 660) associated with that region of interest. IPE, for each RoI, the system may identify a region in the second combined regional feature map that corresponds to that RoI. That region may then be used to generate the desired output, such as information associated with an object instance in the RoI. For example, the information associated with the object instance may be an instance segmentation mask, a keypoint mask, a bounding box, or a classification.

Particular embodiments may repeat one or more steps of the process of FIG. 6, where appropriate. Although this disclosure describes and illustrates particular steps of the process of FIG. 6 as occurring in a particular order, this disclosure contemplates any suitable steps of the process of FIG. 6 occurring in any suitable order. Moreover, although this disclosure describes and illustrates an example method for optimizing convolutional operations, including the particular steps of the process shown in FIG. 6, this disclosure contemplates any suitable process for doing so, including any suitable steps, which may include all, some, or none of the steps of the process shown in FIG. 6, where appropriate. Furthermore, although this disclosure describes and illustrates particular components, devices, or systems carrying out particular steps of the process of FIG. 6, this disclosure contemplates any suitable combination of any suitable components, devices, or systems carrying out any suitable stages of the process of FIG. 6.

IPE, training of the neural networks for performing convolutional operations on the combined regional feature map may similarly be based on combinations of regional feature maps that are generated during training. For example, for each training image, a training system may generate a feature map (e.g., using the aforementioned trunk), identify RoIs (e.g., using an RPN), generate regional feature maps for the RoIs (e.g., using RoIAlign), and combine the regional feature maps into a larger combined regional feature map, in a similar manner described above. The neural network that is being trained may then process the combined regional feature map to generate a second combined regional feature map. The system may then compare results based on the second combined regional feature map to the corresponding ground truths, and use the comparison results (e.g., as defined by loss functions) to update the neural network. IPE, the system may, for each RoI, identify a corresponding region in the second combined regional feature map and use it to generate an output (e.g., segmentation mask, bounding box, keypoints, etc.). Each output may then be compared with its corresponding ground truth. IPE, the ground truths may similarly be tiled to form a combined ground truth. IPE, the ground truths may have relative positions in the combined ground truth that mirror the relative positions of the corresponding regional feature maps in the combined regional feature map. For example, if the combined regional feature map includes regional feature maps A, B, and C in a row and in that order, the combined ground truth may also include corresponding ground truths A, B, and C in the same order. The error or loss of the predictions may then be computed based on a comparison between the output of the convolutional layers and the combined ground truth.

In particular embodiments, the trained machine-learning model's runtime may further be improved by selectively allocating particular operations to different types of resources. At inference time, different operations may be assigned to different types of processing resources, such as CPU and GPU. Certain segments of operations within the model's operation tree (e.g., a logical representation of the operations performed by the model) may be assigned to a specified type of processing resource that is better suited for performing that type of operation (e.g., more efficient, support the type of data, etc.). Selection of the optimal allocation may be based on benchmarking. For example, different combinations of operation segments may be allocated for processing by a device's GPU or CPU, and the resulting performance and the time needed to transfer the results to another type of processing unit (as well as any other metrics) may be used to determine how best to segment and allocate the operations. In particular embodiments, the benchmarking process may be automatically performed by automatically segmenting the operation tree in different combinations and/or allocating the segments to different computing resources in different combinations. The end performance results may then be ranked to determine which segmentation and/or allocation combination yields the best result.

As described, the machine-learning model according to particular embodiments is compact and optimized for inference-time speed. Such optimizations may, in certain circumstances, result in the accuracy of the prediction results to be less than optimal. To compensate, particular embodiments may perform post-processing to correct or adjust the model's predictions. In particular, the keypoints predictions generated by the keypoint head may be automatically corrected based on a pose model. At a high level, the pose model may learn the poses that humans are likely to make. Using the post model, the keypoints predictions generated by the keypoint head may be automatically adjusted to reflect the more likely poses that the pose model has learned.

In particular embodiments, a two-dimensional (2D) body pose may be represented by a vector $S=[x_0, y_0, x_1, y_1, \ldots, x_{N-1}, y_{N-1},]^T$ that concatenates x and y coordinates of all the keypoints. In particular embodiments, human poses may be represented by any number of keypoints (e.g., N=5, 10, 19, 30, etc.), as described above. Each (x, y) coordinate in S may be defined in an implicit coordinate system of the image. For example, the top-left corner (or any other point) of the image may be defined as the origin (0, 0) of the coordinate space and all other coordinates may be defined relative to the origin. In particular embodiments, each pose S may be normalized, via a transformation function denoted r(S), to a local coordinate system that is defined to be relative to one or more of the predetermined parts of the body represented by the pose. For example, each transformed coordinate (x', y') in r(S), which continues to indicate a joint location, may be defined relative to, e.g., the points corresponding to the body's head, shoulders, and/or hips (e.g., the origin (0, 0) may be defined to be the head, the midpoint between the shoulders, the midpoint between the hips, or the midpoint between the respective midpoints of the shoulders and hips). The r(S) coordinates, therefore, may be considered as a set of normalized coordinates. After a local coordinate system for the pose is defined based on its shoulders and hips, for example, a transformation matrix M between the original implicit coordinate system and the local coordinate system may be defined. In particular embodiments, r(S) may be a function that applies M to each (x, y) coordinate in S.

A morphable 2D pose representation of the pose S may be generated based on Principal Component Analysis (PCA), in accordance with particular embodiments. A PCA transformation model may be trained based a training dataset D containing t training poses $S_1 \ldots S_t$, each of which may be a vector of concatenated coordinates of keypoints that correspond to predefined joints or other body parts. The poses in the training dataset D may all be normalized into the same local coordinate system by applying r(S) to each of $S_1 \ldots S_t$. An average of all r(S) in the dataset D may be represented as mean pose $S_m$:

$$S_m = \frac{1}{t}\sum_{i=1}^{1t} r(S_i)$$

In particular embodiments, a new pose S(B) may be generated using the PCA model based on the following definition:

$$S(B)=S_m+V_k*B,$$

where $V_k$ denotes the first k eigenvectors (e.g., corresponding to the top k principal components with the most variance), $S_m$ denotes mean pose, and $B=[\beta_0, \beta_1, \ldots, \beta_{k-1}]$ denotes the low-dimensional representation of the pose. For a given pose S (or its normalized counterpart r(S)), the pose representation B could be computed as:

$$B(S)=V_k^{T}*(S-S_m)$$

Figures 7A, 7B, 7C:
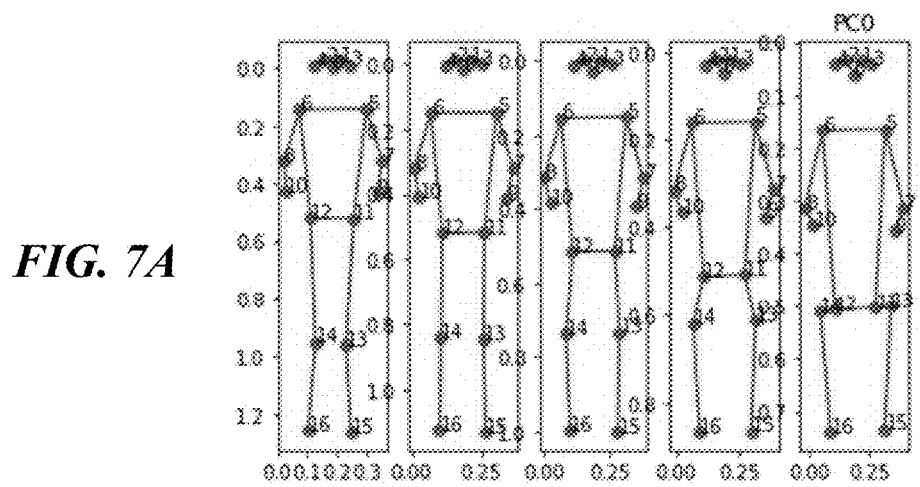
FIGS. 7A-7C illustrate examples of how components of a low-dimensional representation of a pose may affect characteristics of the pose.

FIGS. 7A-7C illustrate examples of how the pose model may morph or deform when changing $\beta_0$, $\beta_1$, and $\beta_2$ of the first three components of B. One can see that the first component $\beta_0$ controls the leg length as shown in FIG. 7A, the second component $\beta_1$ controls the left-right pose as shown in FIG. 7B, and the third component $\beta_2$ controls the body width as shown in FIG. 7C.

In particular embodiments, to further constrain the low-dimensional space of pose representation B, a pose-representation probability model for each dimension of B may be learned based on the poses projected to the low-dimensional space. Each dimension may be modeled by a Gaussian distribution $g_i$ and the pose-representation probability model of B may be defined as:

$$A(B)=\Pi g_i(B_i)$$

In particular embodiments, the pose prediction as represented by the keypoints generated by the keypoint head of the machine-learning model may be adjusted as follows. In particular embodiments, the keypoint head may output a plurality of pose probability models H corresponding to a plurality of body parts (e.g., joints), respectively. The plurality of pose probability models may be configured for determining a probability of the associated body part being at a location in the image. For example, each pose probability model may be a heat map that indicates, for each location represented in the heat map, a probability or confidence score that the associated body part is located at that location. Given the pose probability models H, a post-processing objective may be to find a high-likelihood pose S that best fits the following formulation:

$$S^* = \arg\min_S \{-\log(\Pi(H_i(S_i))) - \log(A(V_k^T * (r(S) - S_m))) + a * \|S(B(r(S))) - r(S)\|^2\}$$

where $S_i$ is the i-th coordinate $(x_1, y_1)$ in S that corresponds to a predetermined i-th body part (e.g., a particular joint), $H_i(S_i)$ is the confidence or likelihood of the i-th joint or body part in S being at position $(x_i, y_i)$ in the image, r(S) is the pose S normalized to the local coordinate, S(B(r(S))) represents the reprojected pose of the pose representation B that lies on the underlying low-dimensional space, and a is the weight between two terms. This problem could be solved by gradient-based optimization or any other suitable optimization technique.

In particular embodiments, to speed up the process, the optimization may be approximated using a discrete approach. For each joint heat-map, the first few (e.g., one or two) local maxima may be found and used as candidates using mean shift algorithm based on the type of joints. For each combination of the candidates, the cost of the pose S may be computed as:

$$E = -\log(\Pi(H_i(S_i))) - \log(A(V_k^T * (r(S) - S_m))) + a * \|S(B(r(S))) - r(S)\|^2$$

The pose with the minimal cost may be used as the final pose.

Figure 8:
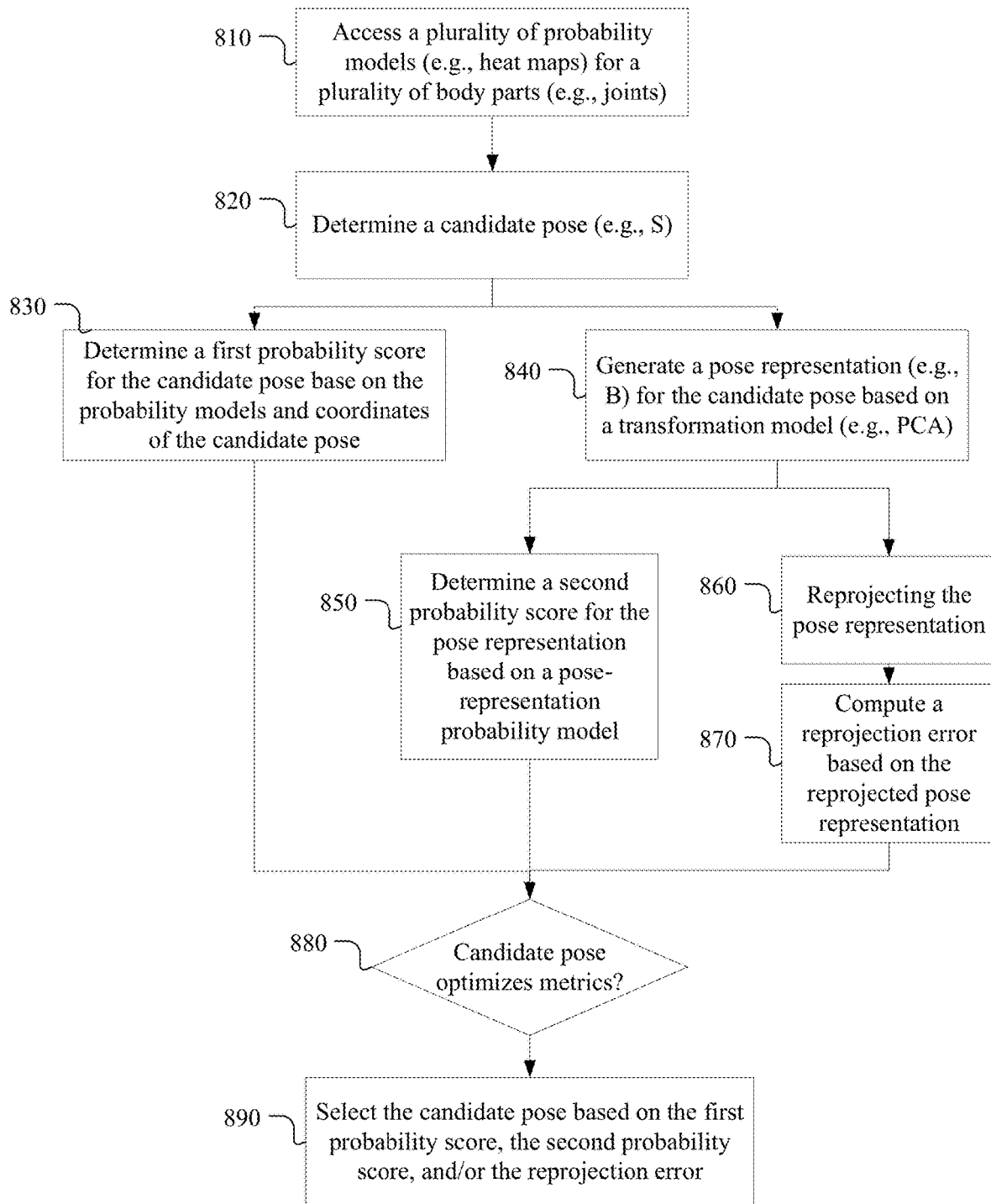
FIG. 8 illustrates an example method for generating a pose prediction.

FIG. 8 illustrates an example method for generating a pose prediction based on pose probability models, such as those generated by the keypoint head described herein. The method may begin at step 810, where a computing system may access a plurality of pose probability models for a plurality of predetermined parts of a body that is depicted in an image, respectively. Each of the plurality of pose probability models is configured for determining a probability of the associated predetermined part of the body being at a location in the image. As previously described, the pose probability models may be probability heat maps generated by the keypoint head.

At step 820, the system may determine a candidate pose that is defined by a set of coordinates representing candidate locations of the predetermined parts of the body in the image. The candidate pose may be determined as part of the optimization process (e.g., either via a gradient-based or discrete-based approach). The candidate pose may be the aforementioned S, defined in the implicit coordinate system.

At step 830, the system may determine a probability score for the candidate pose based on the plurality of pose probability models and the set of coordinates of the candidate pose. For example, the probability score may be based on $H_i(S_i)$, where the probability of each keypoint $S_i$ of the pose S is looked up in the corresponding pose probability model (e.g., a heat map) $H_i$ to determine the likelihood of that keypoint being correct. The overall probability score may then be computing by, e.g., multiplying the $H_i(S_i)$ of every i-th joint in S.

At step 840, the system may generate a pose representation for the candidate pose using a transformation model (e.g., based on PCA) and the candidate pose. In particular embodiments, the transformation model may be applied to the candidate pose S (i.e., B(S)), in which the coordinate of each keypoint is defined in an implicit coordinate system. In other embodiments, the transformation model may be applied to a corresponding set of normalized coordinates defined in a local coordinate (i.e., B(r(S))). IPE, the transformation model may apply PCA eigenvectors to differences between the set of normalized coordinates (e.g., r(S)) and an aggregate representation of a plurality of sets of normalized coordinates that are associated with a plurality of poses (e.g., $S_m$), respectively. The resulting pose representation B may be defined in a spatial dimension that is of lower dimensionality than S or r(S).

At step 850, the system may determine a second probability score for the pose representation B based on a pose-representation probability model, such as the model A described above. For example, the system may use a Gaussian distribution model, generated based on known B values for a set of training images, to determine a probability or likelihood of each individual point in B being correct. The aggregate (e.g., based on a multiplication) of the individual probabilities may then represent the probability score for the pose representation B being correct.

IPE, either in parallel with or sequential to step 850, the system may further compute a reprojection error. For example, at step 860, the system may reproject the pose representation B from its spatial dimension into another spatial dimension associated with the coordinate system of the pose that is represented by the pose representation. For example, if the pose representation B(r(S)) represents the normalized coordinates r(S), then the reprojection S(B(r(S))) may be from the spatial dimension of B back into the spatial dimension of r(S). Similarly, if the pose representation B(S) represents the candidate pose S, then the reprojection S(B(S)) may be from the spatial dimension of B back into the spatial dimension of S. At step 870, the system may then compute a reprojection error based on the reprojected pose representation and the original coordinates represented by B (e.g., S(B(r(S)))–r(S) or S(B(S))–S).

At step 880, the system may determine whether the candidate pose S satisfies one or more criteria, based on one or more of the metrics determined above in steps 830, 850, and 870. As discussed, the criteria may be formulated as an optimization problem, where the objective is to find the S that optimizes the metrics (e.g., maximizes the probability of correctness for the candidate pose, maximizes the probability of correctness for the pose representation, and/or minimizing the reprojection error). WE, the previous steps may be repeated iteratively until such a candidate S is determined.

At step 890, the system may select the candidate pose to represent a pose of the body depicted in the image based on at least the first probability score for the candidate pose, the second probability score for the pose representation, and/or the reprojection error.

Particular embodiments may repeat one or more steps of the process of FIG. 8, where appropriate. Although this disclosure describes and illustrates particular steps of the process of FIG. 8 as occurring in a particular order, this disclosure contemplates any suitable steps of the process of FIG. 8 occurring in any suitable order. Moreover, although this disclosure describes and illustrates an example method for selecting a pose, including the particular steps of the process shown in FIG. 8, this disclosure contemplates any suitable process for doing so, including any suitable steps, which may include all, some, or none of the steps of the process shown in FIG. 8, where appropriate. Furthermore, although this disclosure describes and illustrates particular components, devices, or systems carrying out particular steps of the process of FIG. 8, this disclosure contemplates any suitable combination of any suitable components, devices, or systems carrying out any suitable stages of the process of FIG. 8.

Figure 9A:
FIGS. 9A and 9B illustrate an example of how keypoints generated by a machine-learning model may be adjusted using a pose model.
Figure 9B:

FIGS. 9A and 9B illustrate an example of how keypoints generated by the machine-learning model may be adjusted using a pose model. FIG. 9A shows the initial results generated from the keypoint head of the machine-learning model. FIG. 9B shows the final results after applying the post-processing pose model. The pose model effectively removes incorrect localizations (e.g., leg-crossing).

Figure 10:
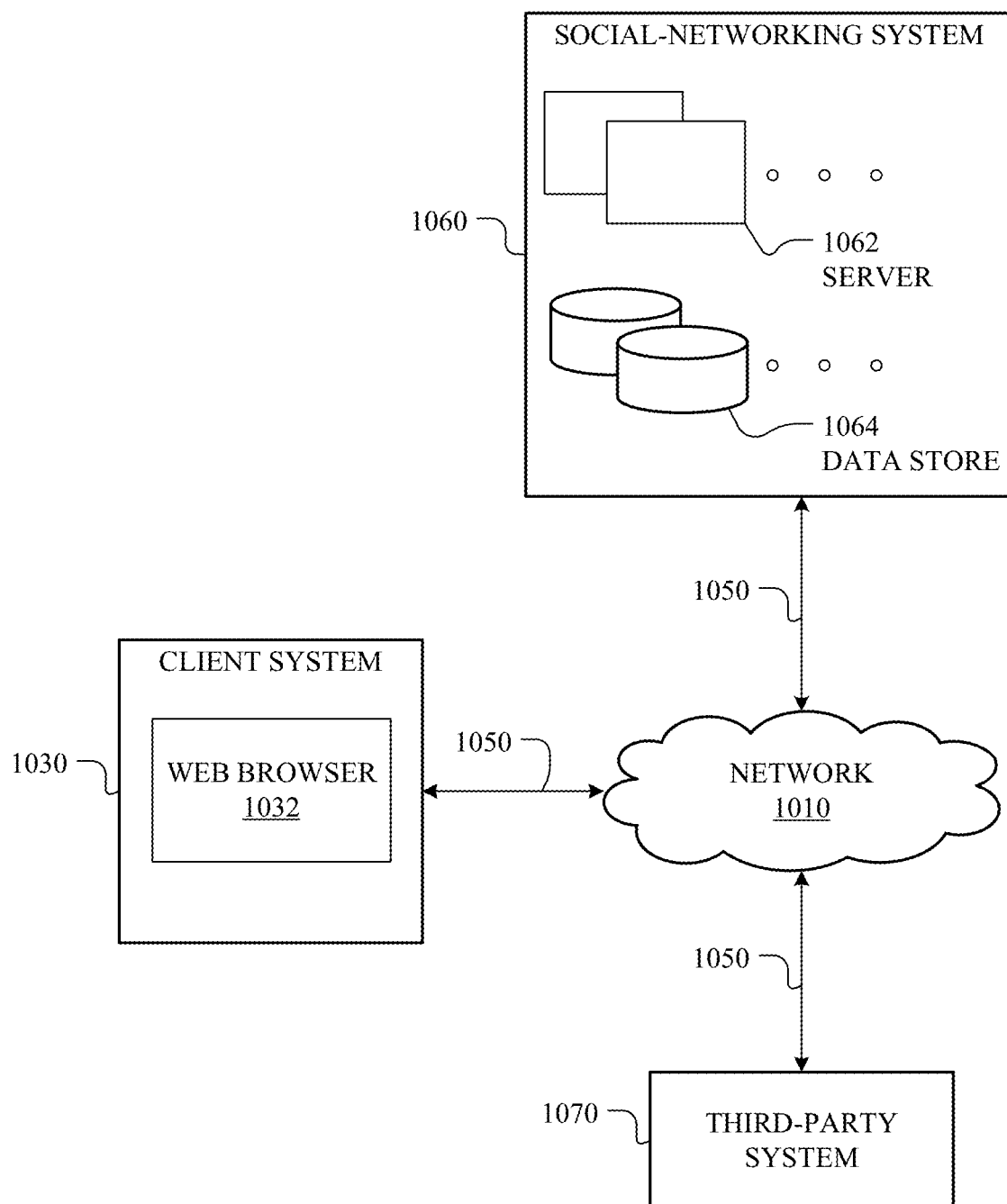
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links.

In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser 1032, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
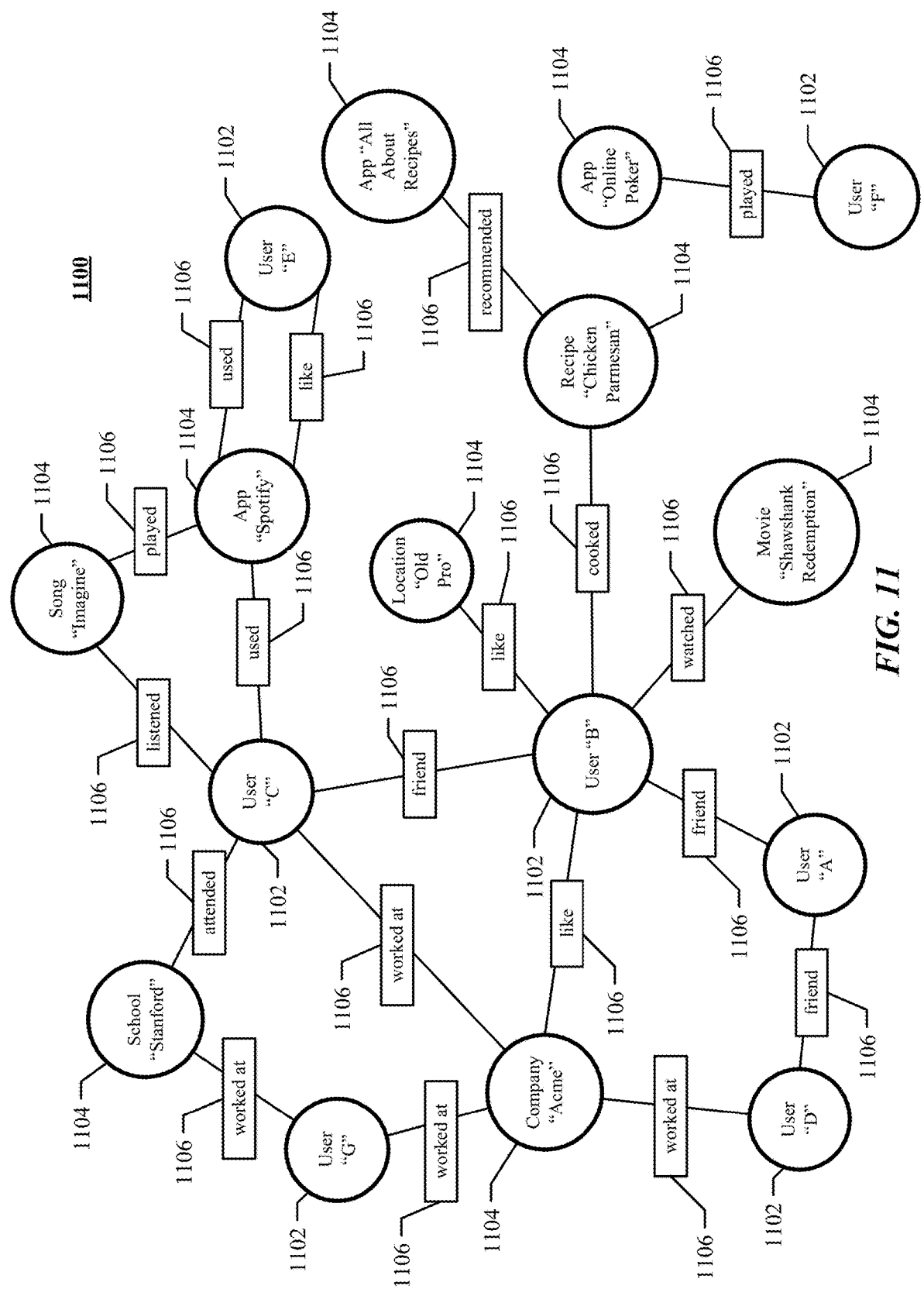
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; an object in an augmented/virtual reality environment; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060.

Profile pages may also be hosted on third-party websites associated with a third-party system 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1030 to send to social-networking system 1060 a message indicating the user's action. In response to the message, social-networking system 1060 may create an edge (e.g., a check-in-type edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106. The degree of separation between two objects represented by two nodes, respectively, is a count of edges in a shortest path connecting the two nodes in the social graph 1100. As an example and not by way of limitation, in the social graph 1100, the user node 1102 of user "C" is connected to the user node 1102 of user "A" via multiple paths including, for example, a first path directly passing through the user node 1102 of user "B," a second path passing through the concept node 1104 of company "Acme" and the user node 1102 of user "D," and a third path passing through the user nodes 1102 and concept nodes 1104 representing school "Stanford," user "G," company "Acme," and user "D." User "C" and user "A" have a degree of separation of two because the shortest path connecting their corresponding nodes (i.e., the first path) includes two edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

Figure 12:
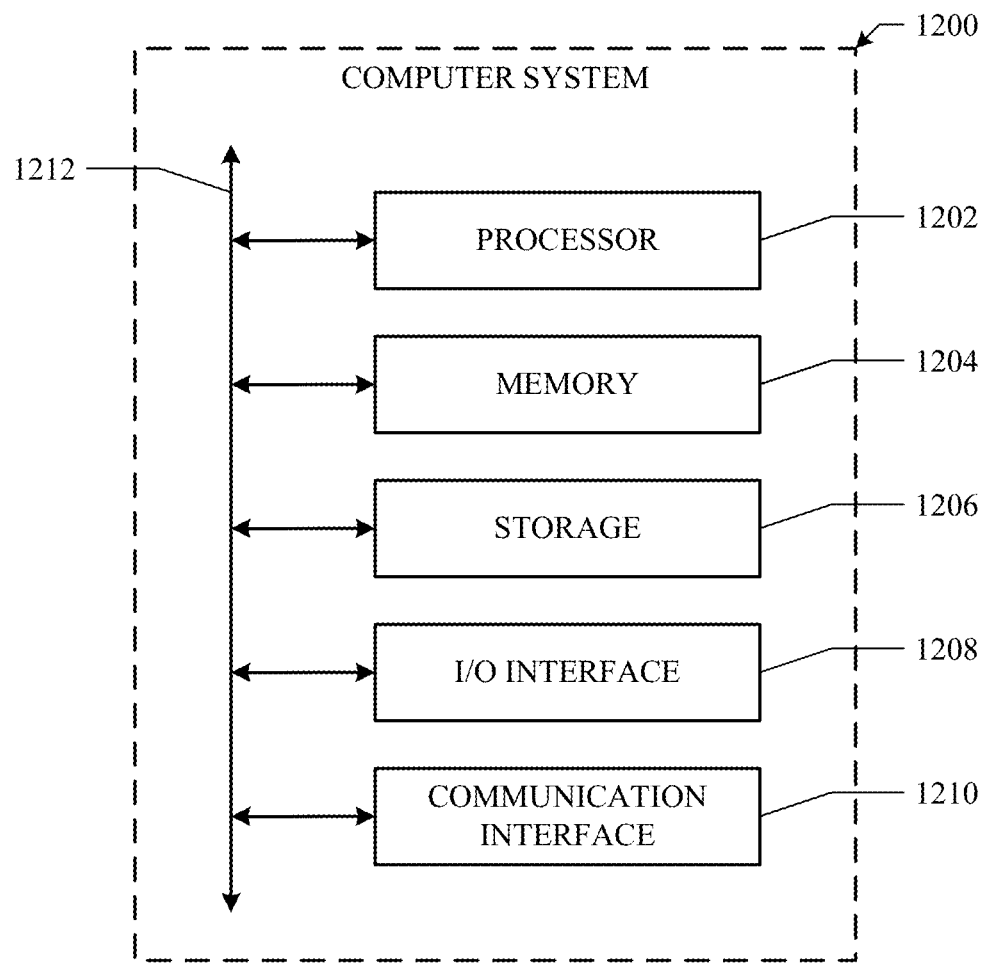
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing an image;
   generating a feature map for the image using a neural network;
   identifying a plurality of regions of interest in the feature map;
   generating a plurality of regional feature maps for the plurality of regions of interest, respectively, wherein each of the plurality of regional feature maps has a first dimension, a second dimension, and a third dimension;
   generating a first combined regional feature map by combining the plurality of regional feature maps, wherein the combined regional feature map has a first dimension, a second dimension, and a third dimension;
   generating a second combined regional feature map by processing the first combined regional feature map using one or more convolutional layers, wherein the processing of the first combined regional feature map is performed using a neural processing engine configured for performing convolutional operations on three-dimensional tensors; and
   generating, for each of the plurality of regions of interest, information associated with an object instance based on a portion of the second combined regional feature map associated with that region of interest.

2. The method of claim 1, wherein the first dimension and the second dimension of the first combined regional feature map are equal to the first dimension and the second dimension of each of the plurality of regional feature maps, respectively.

3. The method of claim 2, wherein the third dimension of the first combined regional feature map is equal to or larger than a combination of the respective third dimensions of the plurality of regional feature maps.

4. The method of claim 3,
   wherein the third dimension of each of the plurality of regional feature maps corresponds to height size or width size;
   wherein the first dimension or the second dimension corresponds to channel size.

5. The method of claim 1, wherein the first combined regional feature map includes the plurality of regional feature maps with paddings inserted between adjacent pairs of the plurality of regional feature maps.

6. The method of claim 5, wherein a size of the padding between each adjacent pair of the plurality of regional feature maps is at least as wide as a kernel size used by the one or more convolutional layers.

7. The method of claim 1, wherein the information associated with the object instance is an instance segmentation mask, a keypoint mask, or a bounding box.

8. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
   accessing an image;
   generating a feature map for the image using a neural network;
   identifying a plurality of regions of interest in the feature map;
   generating a plurality of regional feature maps for the plurality of regions of interest, respectively, wherein each of the plurality of regional feature maps has a first dimension, a second dimension, and a third dimension;
   generating a first combined regional feature map by combining the plurality of regional feature maps, wherein the combined regional feature map has a first dimension, a second dimension, and a third dimension;
   generating a second combined regional feature map by processing the first combined regional feature map using one or more convolutional layers, wherein the processing of the first combined regional feature map is performed using a neural processing engine configured for performing convolutional operations on three-dimensional tensors; and
   generating, for each of the plurality of regions of interest, information associated with an object instance based on a portion of the second combined regional feature map associated with that region of interest.

9. The system of claim 8, wherein the first dimension and the second dimension of the first combined regional feature map are equal to the first dimension and the second dimension of each of the plurality of regional feature maps, respectively.

10. The system of claim 9, wherein the third dimension of the first combined regional feature map is equal to or larger than a combination of the respective third dimensions of the plurality of regional feature maps.

11. The system of claim 10,
wherein the third dimension of each of the plurality of regional feature maps corresponds to height size or width size; and
wherein the first dimension or the second dimension corresponds to channel size.

12. The system of claim 8, wherein the first combined regional feature map includes the plurality of regional feature maps with paddings inserted between adjacent pairs of the plurality of regional feature maps.

13. The system of claim 12, wherein a size of the padding between each adjacent pair of the plurality of regional feature maps is at least as wide as a kernel size used by the one or more convolutional layers.

14. One or more computer-readable non-transitory storage media embodying software that is operable when executed to cause one or more processors to perform operations comprising:
accessing an image;
generating a feature map for the image using a neural network;
identifying a plurality of regions of interest in the feature map;
generating a plurality of regional feature maps for the plurality of regions of interest, respectively, wherein each of the plurality of regional feature maps has a first dimension, a second dimension, and a third dimension;
generating a first combined regional feature map by combining the plurality of regional feature maps, wherein the combined regional feature map has a first dimension, a second dimension, and a third dimension;
generating a second combined regional feature map by processing the first combined regional feature map using one or more convolutional layers, wherein the processing of the first combined regional feature map is performed using a neural processing engine configured for performing convolutional operations on three-dimensional tensors; and
generating, for each of the plurality of regions of interest, information associated with an object instance based on a portion of the second combined regional feature map associated with that region of interest.

15. The media of claim 14, wherein the first dimension and the second dimension of the first combined regional feature map are equal to the first dimension and the second dimension of each of the plurality of regional feature maps, respectively.

16. The media of claim 15, wherein the third dimension of the first combined regional feature map is equal to or larger than a combination of the respective third dimensions of the plurality of regional feature maps.

17. The media of claim 16,
wherein the third dimension of each of the plurality of regional feature maps corresponds to height size or width size;
wherein the first dimension or the second dimension corresponds to channel size.

* * * * *